(12) United States Patent
Srinivasan

(10) Patent No.: US 7,783,889 B2
(45) Date of Patent: Aug. 24, 2010

(54) METHODS AND APPARATUS FOR GENERATING SIGNATURES

(75) Inventor: Venugopal Srinivasan, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 199 days.

(21) Appl. No.: 11/676,452

(22) Filed: Feb. 19, 2007

(65) Prior Publication Data

US 2007/0274537 A1 Nov. 29, 2007

Related U.S. Application Data

(63) Continuation of application No. PCT/US2005/029623, filed on Aug. 18, 2005.

(60) Provisional application No. 60/603,024, filed on Aug. 18, 2004.

(51) Int. Cl.
*H04L 9/00* (2006.01)
(52) U.S. Cl. .................. 713/179; 713/176; 725/19; 725/20; 380/202; 380/239; 381/94.3
(58) Field of Classification Search .............. 713/160, 713/176, 179; 380/202, 206, 207, 239, 253, 380/229; 382/100, 232, 240, 191; 381/94.3; 375/134; 704/268, 273; 725/19, 20
See application file for complete search history.

(56) References Cited

U.S. PATENT DOCUMENTS 4,230,990 A 10/1980 Lert, Jr. et al.
(Continued)

FOREIGN PATENT DOCUMENTS

AU 718227 11/1997
(Continued)

OTHER PUBLICATIONS

United States Patent and Trademark Office, "PCT International Search Report," issued by the International Searching Authority of the United States Patent and Trademark Office on Feb. 6, 2008, in connection with a counterpart international application No. PCT/US2005/029623 (3 pages).

(Continued)

*Primary Examiner*—Nasser Moazzami
*Assistant Examiner*—Shanto M Abedin
(74) *Attorney, Agent, or Firm*—Hanley, Flight and Zimmerman, LLC

(57) ABSTRACT

Methods, apparatus, and articles of manufacture for media monitoring are disclosed. In particular, the example methods, apparatus, and articles of manufacture generate digital spectral signatures for use in identifying media information. Initially, a frame of media samples is obtained. A first frequency component having a first spectral power and a second frequency component having a second spectral power are identified by performing a spectral transform operation on the frame of media samples. A descriptor of the first frame of media samples is determined based on a comparison of the first spectral power and the second spectral power. A first signature is then generated based on the descriptor.

17 Claims, 12 Drawing Sheets

U.S. PATENT DOCUMENTS

| | | | | |
|---|---|---|---|---|
| 4,450,531 | A | 5/1984 | Kenyon et al. | |
| 4,677,466 | A * | 6/1987 | Lert et al. | 725/22 |
| 4,697,209 | A * | 9/1987 | Kiewit et al. | 725/19 |
| 4,739,398 | A | 4/1988 | Thomas et al. | |
| 4,843,562 | A | 6/1989 | Kenyon et al. | |
| 4,931,871 | A | 6/1990 | Kramer | |
| 4,945,412 | A | 7/1990 | Kramer | |
| 4,947,436 | A | 8/1990 | Greaves et al. | |
| 5,019,899 | A | 5/1991 | Boles et al. | |
| 5,436,653 | A | 7/1995 | Ellis et al. | |
| 5,437,050 | A | 7/1995 | Lamb et al. | |
| 5,450,490 | A * | 9/1995 | Jensen et al. | 380/253 |
| 5,481,294 | A | 1/1996 | Thomas et al. | |
| 5,485,518 | A | 1/1996 | Hunter et al. | |
| 5,504,518 | A | 4/1996 | Ellis et al. | |
| 5,572,246 | A | 11/1996 | Ellis et al. | |
| 5,581,658 | A | 12/1996 | O'Hagan et al. | |
| 5,612,729 | A | 3/1997 | Ellis et al. | |
| 5,621,454 | A | 4/1997 | Ellis et al. | |
| 5,809,160 | A | 9/1998 | Powell et al. | |
| 5,822,436 | A | 10/1998 | Rhoads | |
| 5,826,164 | A | 10/1998 | Weinblatt | |
| 5,875,122 | A | 2/1999 | Acharya | |
| 5,909,518 | A | 6/1999 | Chui | |
| 5,918,223 | A | 6/1999 | Blum et al. | |
| 6,061,793 | A * | 5/2000 | Tewfik et al. | 713/176 |
| 6,072,888 | A | 6/2000 | Powell et al. | |
| 6,122,392 | A | 9/2000 | Rhoads | |
| 6,175,627 | B1 | 1/2001 | Petrovic et al. | |
| 6,226,387 | B1 * | 5/2001 | Tewfik et al. | 382/100 |
| 6,230,176 | B1 | 5/2001 | Mizutani | |
| 6,240,062 | B1 | 5/2001 | Kozaki et al. | |
| 6,253,182 | B1 * | 6/2001 | Acero | 704/268 |
| 6,266,430 | B1 | 7/2001 | Rhoads | |
| 6,272,176 | B1 * | 8/2001 | Srinivasan | 375/240 |
| 6,330,335 | B1 | 12/2001 | Rhoads | |
| 6,366,937 | B1 | 4/2002 | Shridhar et al. | |
| 6,385,330 | B1 | 5/2002 | Powell et al. | |
| 6,404,898 | B1 | 6/2002 | Rhoads | |
| 6,421,445 | B1 | 7/2002 | Jensen et al. | |
| 6,459,803 | B1 | 10/2002 | Powell et al. | |
| 6,466,670 | B1 | 10/2002 | Tsuria et al. | |
| 6,469,749 | B1 | 10/2002 | Dimitrova et al. | |
| 6,496,591 | B1 | 12/2002 | Rhoads | |
| 6,504,870 | B2 * | 1/2003 | Srinivasan | 375/240 |
| 6,513,161 | B2 * | 1/2003 | Wheeler et al. | 725/14 |
| 6,542,620 | B1 | 4/2003 | Rhoads | |
| 6,560,349 | B1 | 5/2003 | Rhoads | |
| 6,560,350 | B2 | 5/2003 | Rhoads | |
| 6,567,780 | B2 | 5/2003 | Rhoads | |
| 6,574,594 | B2 | 6/2003 | Pitman et al. | |
| 6,597,405 | B1 | 7/2003 | Iggulden | |
| 6,604,072 | B2 | 8/2003 | Pitman et al. | |
| 6,614,915 | B2 | 9/2003 | Powell et al. | |
| 6,633,651 | B1 | 10/2003 | Hirzalla et al. | |
| 6,647,129 | B2 | 11/2003 | Rhoads | |
| 6,647,130 | B2 | 11/2003 | Rhoads | |
| 6,675,383 | B1 | 1/2004 | Wheeler et al. | |
| 6,678,392 | B2 | 1/2004 | Powell et al. | |
| 6,714,683 | B1 | 3/2004 | Tian et al. | |
| 6,757,407 | B2 * | 6/2004 | Bruckstein et al. | 382/100 |
| 6,799,274 | B1 * | 9/2004 | Hamlin | 713/176 |
| 6,839,673 | B1 * | 1/2005 | Choi et al. | 704/273 |
| 6,959,386 | B2 | 10/2005 | Rhoads | |
| 6,968,337 | B2 | 11/2005 | Wold | |
| 6,971,010 | B1 * | 11/2005 | Abdel-Mottaleb | 713/176 |
| 7,006,555 | B1 * | 2/2006 | Srinivasan | 375/133 |
| 7,073,065 | B2 * | 7/2006 | Stone | 713/176 |
| 7,120,562 | B1 * | 10/2006 | Wilson | 702/189 |
| 7,221,902 | B2 * | 5/2007 | Kopra et al. | 455/3.05 |
| 7,269,338 | B2 * | 9/2007 | Janevski | 386/96 |
| 7,284,128 | B2 * | 10/2007 | Sako | 713/176 |
| 7,512,801 | B1 | 3/2009 | Akiyama et al. | |
| 7,562,012 | B1 | 7/2009 | Wold et al. | |
| 2001/0005823 | A1 | 6/2001 | Fischer et al. | |
| 2001/0029580 | A1 | 10/2001 | Moskowitz | |
| 2002/0178410 | A1 | 11/2002 | Haitsma et al. | |
| 2002/0186768 | A1 | 12/2002 | Dimitrova et al. | |
| 2003/0005430 | A1 | 1/2003 | Kolessar | |
| 2003/0036910 | A1 * | 2/2003 | Van Der Veen et al. | 704/500 |
| 2003/0086341 | A1 | 5/2003 | Wells et al. | |
| 2003/0131350 | A1 | 7/2003 | Peiffer et al. | |
| 2003/0156827 | A1 * | 8/2003 | Janevski | 386/96 |
| 2003/0223584 | A1 * | 12/2003 | Bradley et al. | 380/229 |
| 2004/0122679 | A1 | 6/2004 | Neuhauser et al. | |
| 2004/0210922 | A1 | 10/2004 | Peiffer et al. | |
| 2005/0257064 | A1 * | 11/2005 | Boutant et al. | 713/180 |
| 2006/0107057 | A1 * | 5/2006 | Lewis et al. | 713/176 |
| 2006/0184961 | A1 | 8/2006 | Lee et al. | |
| 2006/0195861 | A1 * | 8/2006 | Lee | 725/19 |

FOREIGN PATENT DOCUMENTS

| | | |
|---|---|---|
| AU | 747044 | 9/2000 |
| EP | 0887958 | 12/1998 |
| EP | 0987855 A2 | 3/2000 |
| JP | 3173291 | 7/1991 |
| WO | WO0079709 | 12/2000 |
| WO | WO02065782 | 8/2002 |
| WO | 2005/006768 | 1/2005 |

OTHER PUBLICATIONS

Graps, Amara, "An Introduction to Wavelets," Institute of Electrical and Electronics Engineers, Inc., Summer 1995, Los Alamitos, USA (18 pages).

Haitsma et al., "Robust Audio Hashing for Content Identification," Philips Research, Eindhoven, NL, http://cite.seer.ist.psu.edu/haitsma01robust.html, 2001 (8 pages).

Conner, Margery, "Advantages of the Sliding-Mode DFT," www.edn.com, Jan. 9, 2002 (1 page).

International Preliminary Examining Authority, "PCT International Preliminary Examination Report," issued by the United States Patent and Trademark Office on May 6, 2008, in connection with a counterpart international applicaton No. PCT/US2005/029623 (9 pages).

Mexican Institute of Industrial Property issued on Jul. 16, 2009, The result of Substantive Examination (including English Translation) in Mexican patent application No. MX/a/2007/002071, 3 pages with 3 pages English Translation.

Jeffrey D. Taft, PhD., "DSP Design Performance—Breaking barriers in Digital Signal Processing...with new design tools," 2001, [retrieved from http://www.nauticom.net/www.jdtaft/DFT_increm.htm, accessed on Jan. 19, 2004], 1 page.

Schneider et al., "A Robust Content Based Digital Signature for Image Authentication," Columbia University, 1996, 4 pages.

* cited by examiner

METHODS AND APPARATUS FOR GENERATING SIGNATURES

RELATED APPLICATIONS

This patent is a continuation of International Patent Application Ser. No. PCT/US2005/029623, filed Aug. 18, 2005, which claims priority to U.S. Provisional Application 60/603,024, filed on Aug. 18, 2004, both of which are hereby incorporated herein by reference in their entireties.

FIELD OF THE DISCLOSURE

The present disclosure relates generally to media monitoring and, more particularly, to methods and apparatus for generating signatures for use in identifying media information.

BACKGROUND

Identifying media information and more specifically audio streams (e.g., audio information) using signature-matching techniques is well known. Known signature-matching techniques are often used in television and radio audience metering applications and are implemented using several known methods for generating and matching signatures. For example, in television audience metering applications, signatures are generated at monitoring sites (e.g., monitored households) and reference sites. Monitoring sites typically include locations such as, for example, households where the media consumption of audience members is monitored. For example, at a monitoring site, monitored signatures may be generated based on audio streams associated with a selected channel, radio station, etc. The monitored signatures may then be sent to a central data collection facility for analysis. At a reference site, signatures, typically referred to as reference signatures, are generated based on known programs that are provided within a broadcast region. The reference signatures may be stored at the reference site and/or a central data collection facility and compared with monitored signatures generated at monitoring sites. A monitored signature may be found to match with a reference signature and the known program corresponding to the matching reference signature may be identified as the program that was presented at the monitoring site.

DETAILED DESCRIPTION

Figure 1A:
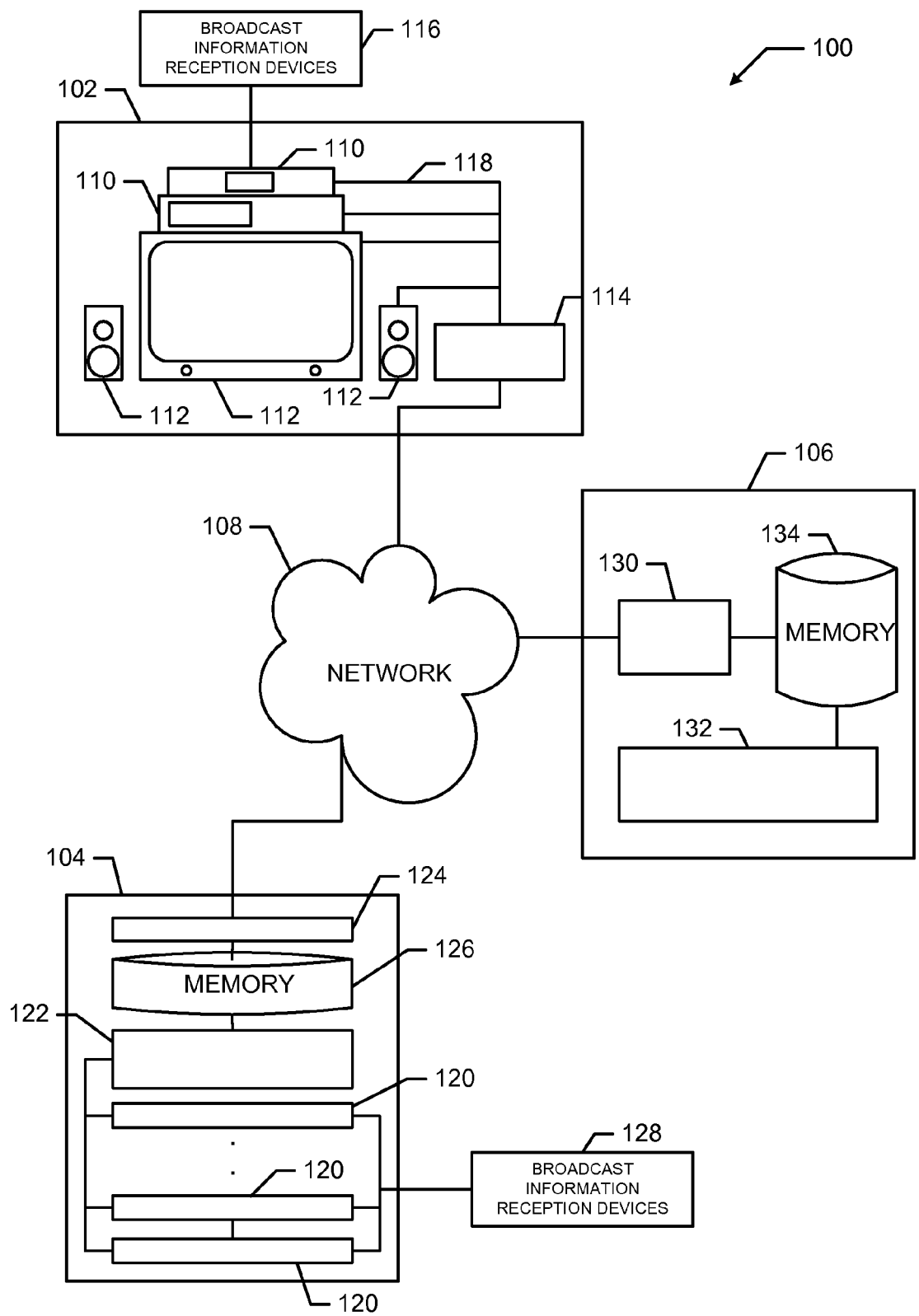
FIGS. 1A and 1B illustrate example audio stream identification systems for generating digital spectral signatures and identifying audio streams.

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons of ordinary skill in the art will readily appreciate that the examples provided are not the only way to implement such systems.

The methods and apparatus described herein generally relate to generating digital spectral signatures, which may be used to identify media information. In particular, the disclosed methods and apparatus are described with respect to generating digital spectral signatures based on audio streams (e.g., audio information). However, the methods and apparatus described herein may also be used to generate digital spectral signatures based on any other type of media information such as, for example, video information, web pages, still images, computer data, etc. Further, the media information may be associated with broadcast information (e.g., television information, radio information, etc.), information reproduced from any storage medium (e.g., compact discs (CD), digital versatile discs (DVD), etc.), or any other information that is associated with an audio stream, a video stream, or any other media information for which the digital spectral signatures are generated. In one particular example, the audio streams are identified based on digital spectral signatures that include monitored digital signatures generated at a monitoring site (e.g., a monitored household) and reference digital signatures generated and/or stored at a reference site and/or a central data collection facility.

As described in detail below, the methods and apparatus described herein identify media information including audio streams based on digital spectral signatures. The digital spectral signatures may be formed using digital descriptors that are generated based on the spectral components of an audio stream and that may be analyzed using frequency transforms and/or wavelet transforms.

Unlike known methods in the prior art that use interframe operations (e.g., operations based on sample data within different data sample frames) to generate digital spectral signatures, the methods and apparatus described herein may be implemented using intraframe operations (e.g., operations based on sample data within a single frame). Intraframe operations may include, for example, comparison operations, determining percentage differences between values, etc. that are performed on two or more values (e.g., spectral power values) that are uniquely associated with or derived from a single frame. For example, using the methods and apparatus described herein, a digital spectral signature may be generated by obtaining a frame of media samples, determining spectral power values by performing a spectral transform (e.g., a FFT, a wavelet transform, etc.) on the frame of media samples, and performing an intraframe operation (e.g., a comparison) based on two or more spectral power values that are uniquely associated with the frame of media samples.

Frequency components of an audio signal are typically generated by transforming the audio signal data (e.g., an audio stream) from the time domain to the frequency domain using, for example, a Fourier Transform. The Fourier Transform can be used to analyze the frequency components in an audio stream and identify the spectral power of each frequency component. The spectral powers may then be used to generate digital spectral signatures.

Digital spectral signatures may also be generated based on wavelet transforms which transform audio data from the time domain to the wavelet domain. In general, wavelet transforms may be used to decompose blocks or frames of data (e.g., time domain audio samples) into multiple sub-bands, thereby allowing data sets to be analyzed at various scales and/or resolutions. By separating data into multiple sub-bands, a wavelet transform may be used to analyze each time interval of data at a desired scale or resolution.

Monitored signatures may be generated at a monitoring site based on audio streams associated with media information (e.g., a monitored audio stream) that is consumed by an audience. For example, a monitored signature may be generated based on the audio track of a television program presented at a monitoring site. The monitored signature may then be communicated to a central data collection facility for comparison to one or more reference signatures.

Reference signatures are generated at a reference site and/or a central data collection facility based on audio streams associated with known media information. The known media information may include media that is broadcast within a region, media that is reproduced within a household, media that is received via the internet, etc. Each reference signature is stored in a memory with media identification information such as, for example, a song title, a movie title, etc. When a monitored signature is received at the central data collection facility, the monitored signature is compared with one or more reference signatures until a match is found. This match information may then be used to identify the media information (e.g., monitored audio stream) from which the monitored signature was generated. For example, a look-up table or a database may be referenced to retrieve a media title, a program identity, an episode number, etc. that corresponds to the media information from which the monitored signature was generated.

As described below in connection with FIGS. 2 and 3, more reference signatures are generated at a reference site and/or a central data collection facility for a given audio stream than monitored signatures generated for a given audio stream at a monitoring site. In particular, the reference signatures generated for an audio stream (i.e., a reference audio stream) overlap in time. More specifically, the starting reference time or timestamp of each reference signature is shifted by a relatively small amount of time from the starting reference time or timestamp of a previous reference signature. In this manner, a monitored signature generated at a monitoring site and having a substantially arbitrary reference time may be aligned and/or matched with at least one of the reference signatures generated for a reference audio stream. As a result of the relatively fewer number of monitored signatures generated at the monitoring site, monitored signatures may be generated by processor systems and/or hardware devices having relatively less computing power and/or memory than processor systems and/or hardware devices used to generate reference signatures.

Figure 1B:
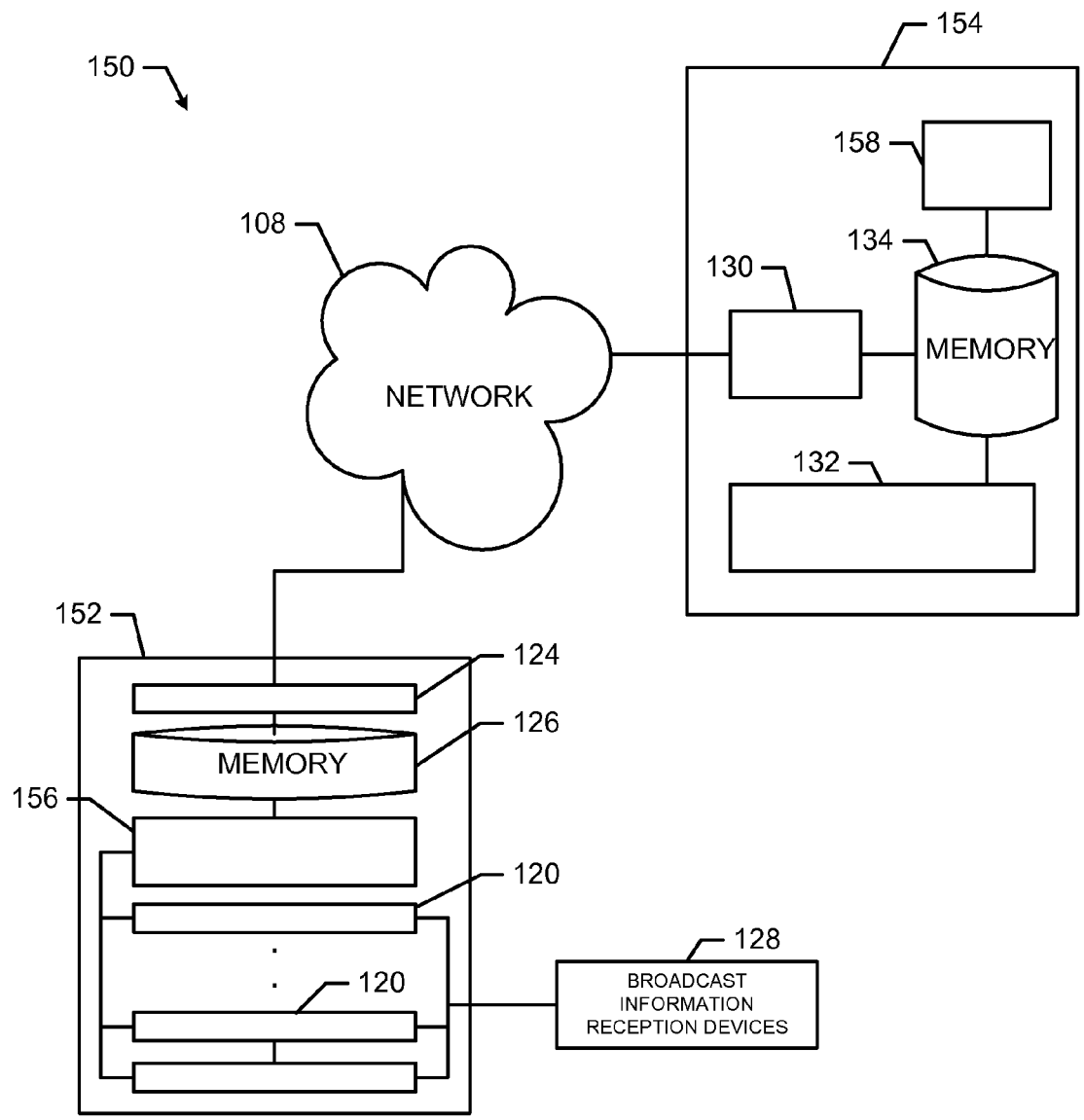

FIGS. 1A and 1B illustrate example audio stream identification systems 100 and 150 for generating digital spectral signatures and identifying audio streams. The example audio stream identification systems 100 and 150 may be implemented as a television broadcast information identification system and a radio broadcast information identification system, respectively. The example audio stream identification system 100 includes a monitoring site 102 (e.g., a monitored household), a reference site 104, and a central data collection facility 106.

Monitoring television broadcast information involves generating monitored signatures at the monitoring site 102 based on the audio data of television broadcast information and communicating the monitored signatures to the central data collection facility 106 via a network 108. Reference signatures may be generated at the reference site 104 and may also be communicated to the central data collection facility 106 via the network 108. The audio content represented by a monitored signature that is generated at the monitoring site 102 may be identified at the central data collection facility 106 by comparing the monitored signature to one or more reference signatures until a match is found. Alternatively, monitored signatures may be communicated from the monitoring site 102 to the reference site 104 and compared one or more reference signatures at the reference site 104. In another example, the reference signatures may be communicated to the monitoring site 102 and compared with the monitored signatures at the monitoring site 102.

The monitoring site 102 may be, for example, a household for which the media consumption of an audience is monitored. In general, the monitoring site 102 may include a plurality of media delivery devices 110, a plurality of media presentation devices 112, and a signature generator 114 that is used to generate monitored signatures associated with media presented at the monitoring site 102.

The plurality of media delivery devices 110 may include, for example, set top box tuners (e.g., cable tuners, satellite tuners, etc.), DVD players, CD players, radios, etc. Some or all of the media delivery devices 110 such as, for example, set top box tuners may be communicatively coupled to one or more broadcast information reception devices 116, which may include a cable, a satellite dish, an antenna, and/or any other suitable device for receiving broadcast information. The media delivery devices 110 may be configured to reproduce media information (e.g., audio information, video information, web pages, still images, etc.) based on, for example, broadcast information and/or stored information. Broadcast information may be obtained from the broadcast information reception devices 116 and stored information may be obtained from any information storage medium (e.g., a DVD, a CD, a tape, etc.). The media delivery devices 110 are communicatively coupled to the media presentation devices 112 and configurable to communicate media information to the media presentation devices 112 for presentation. The media presentation devices 112 may include televisions having a display device and/or a set of speakers by which audience members consume, for example, broadcast television information, music, movies, etc.

The signature generator 114 may be used to generate monitored digital signatures based on audio information as described in greater detail below. In particular, at the monitoring site 102, the signature generator 114 may be configured to generate monitored signatures based on monitored audio streams that are reproduced by the media delivery devices 110 and/or presented by the media presentation devices 112. The signature generator 114 may be communicatively coupled to the media delivery devices 110 and/or the media presentation devices 112 via an audio monitoring interface 118. In this manner, the signature generator 114 may obtain audio streams associated with media information that is reproduced by the media delivery devices 110 and/or presented by the media presentation devices 112. Additionally or alternatively, the signature generator 114 may be communicatively coupled to microphones (not shown) that are placed in proximity to the media presentation devices 112 to detect audio streams. The signature generator 114 may also be communicatively coupled to the central data collection facility 106 via the network 108.

The network 108 may be used to communicate signatures (e.g., digital spectral signatures), control information, and/or configuration information between the monitoring site 102, the reference site 104, and the central data collection facility 106. Any wired or wireless communication system such as, for example, a broadband cable network, a DSL network, a cellular telephone network, a satellite network, and/or any other communication network may be used to implement the network 108.

As shown in FIG. 1A, the reference site 104 may include a plurality of broadcast information tuners 120, a reference signature generator 122, a transmitter 124, a database or memory 126, and broadcast information reception devices 128. The reference signature generator 122 and the transmitter 124 may be communicatively coupled to the memory 126 to store reference signatures therein and/or to retrieve stored reference signatures therefrom.

The broadcast information tuners 120 may be communicatively coupled to the broadcast information reception devices 128, which may include a cable, an antenna, a satellite dish, and/or any other suitable device for receiving broadcast information. Each of the broadcast information tuners 120 may be configured to tune to a particular broadcast channel. In general, the number of tuners at the reference site 104 is equal to the number of channels available in a particular broadcast region. In this manner, reference signatures may be generated for all of the media information transmitted over all of the channels in a broadcast region. The audio portion of the tuned media information may be communicated from the broadcast information tuners 120 to the reference signature generator 122.

The reference signature generator 122 may be configured to obtain the audio portion of all of the media information that is available in a particular broadcast region. The reference signature generator 122 may then generate a plurality of reference signatures (as described in greater detail below) based on the audio information and store the reference signatures in the memory 126. Although one reference signature generator is shown in FIG. 1, a plurality of reference signature generators may be used in the reference site 104. For example, each of the plurality of signature generators may be communicatively coupled to a respective one of the broadcast information tuners 120.

The transmitter 124 may be communicatively coupled to the memory 126 and configured to retrieve signatures therefrom and communicate the reference signatures to the central data collection facility 106 via the network 108.

The central data collection facility 106 may be configured to compare monitored signatures received from the monitoring site 102 to reference signatures received from the reference site 104. In addition, the central data collection facility 106 may be configured to identify monitored audio streams by matching monitored signatures to reference signatures and using the matching information to retrieve television program identification information (e.g., program title, broadcast time, broadcast channel, etc.) from a database. The central data collection facility 106 includes a receiver 130, a signature analyzer 132, and a memory 134, all of which are communicatively coupled as shown.

The receiver 130 may be configured to receive monitored signatures and reference signatures via the network 108. The receiver 130 is communicatively coupled to the memory 134 and configured to store the monitored signatures and the reference signatures therein.

The signature analyzer 132 may be used to compare reference signatures to monitored signatures. The signature analyzer 132 is communicatively coupled to the memory 134 and configured to retrieve the monitored signatures and the reference signatures from the same. The signature analyzer 132 may be configured to retrieve reference signatures and monitored signatures from the memory 134 and compare the monitored signatures to the reference signatures until a match is found. The memory 134 may be implemented using any machine accessible information storage medium such as, for example, one or more hard drives, one or more optical storage devices, etc.

Although the signature analyzer 132 is located at the central data collection facility 106 in FIG. 1A, the signature analyzer 132 may instead be located at the reference site 104. In such a configuration, the monitored signatures may be communicated from the monitoring site 102 to the reference site 104 via the network 108. Alternatively, the memory 134 may be located at the monitoring site 102 and reference signatures may be added periodically to the memory 134 via the network 108 by transmitter 124. Additionally, although the signature analyzer 132 is shown as a separate device from the signature generators 114 and 122, the signature analyzer 132 may be integral with the reference signature generator 122 and/or the signature generator 114. Still further, although FIG. 1 depicts a single monitoring site (i.e., the monitoring site 102) and a single reference site (i.e., the reference site 104), multiple such sites may be coupled via the network 108 to the central data collection facility 106.

The audio stream identification system 150 of FIG. 1B may be configured to monitor and identify audio streams associated with radio broadcast information. In general, the audio stream identification system 150 is used to monitor the content that is broadcast by a plurality of radio stations in a particular broadcast region. Unlike the audio stream identification system 100 used to monitor television content consumed by an audience, the audio stream identification system 150 may be used to monitor music, songs, etc. that are broadcast within a broadcast region and the number of times that they are broadcast. This type of media tracking may be used to determine royalty payments, proper use of copyrights, etc. associated with each audio composition. The audio stream identification system 150 includes a monitoring site 152, a central data collection facility 154, and the network 108.

The monitoring site 152 is configured to receive all radio broadcast information that is available in a particular broadcast region and generate monitored signatures based on the radio broadcast information. The monitoring site 152 includes the plurality of broadcast information tuners 120, the transmitter 124, the memory 126, and the broadcast information reception devices 128, all of which are described above in connection with FIG. 1A. In addition, the monitoring site 152 includes a signature generator 156. When used in the audio stream identification system 150, the broadcast information reception devices 128 are configured to receive radio broadcast information and the broadcast information tuners 120 are configured to tune to the radio broadcast stations. The number of broadcast information tuners 120 at the monitoring site 152 may be equal to the number of radio broadcasting stations in a particular broadcast region.

The signature generator 156 is configured to receive the tuned to audio information from each of the broadcast information tuners 120 and generate monitored signatures for the same. Although one signature generator is shown (i.e., the signature generator 156), the monitoring site 152 may include multiple signature generators, each of which may be communicatively coupled to one of the broadcast information tuners 120. The signature generator 156 may store the monitored signatures in the memory 126. The transmitter 124 may retrieve the monitored signatures from the memory 126 and communicate them to the central data collection facility 154 via the network 108.

The central data collection facility 154 is configured to receive monitored signatures from the monitoring site 152, generate reference signatures based on reference audio streams, and compare the monitored signatures to the reference signatures. The central data collection facility 154 includes the receiver 130, the signature analyzer 132, and the memory 134, all of which are described in greater detail above in connection with FIG. 1A. In addition, the central data collection facility 154 includes a reference signature generator 158.

The reference signature generator 158 is configured to generate reference signatures based on reference audio streams. The reference audio streams may be stored on any type of machine accessible medium such as, for example, a CD, a DVD, a digital audio tape (DAT), etc. In general, artists and/or record producing companies send their audio works (i.e., music, songs, etc.) to the central data collection facility 154 to be added to a reference library. The reference signature generator 158 may read the audio data from the machine accessible medium and generate a plurality of reference signatures based on each audio work (e.g., the reference audio stream 302 of FIG. 3). The reference signature generator 158 may then store the reference signatures in the memory 134 for subsequent retrieval by the signature analyzer 132. Identification information (e.g., song title, artist name, track number, etc.) associated with each reference audio stream may be stored in a database and may be indexed based on the reference signatures. In this manner, the central data collection facility 154 includes a database of reference signatures and identification information corresponding to all known and available song titles.

The receiver 130 is configured to receive monitored signatures from the network 108 and store the monitored signatures in the memory 134. The monitored signatures and the reference signatures are retrieved from the memory 134 by the signature analyzer 132 for use in identifying the monitored audio streams broadcast within a broadcast region. The signature analyzer 132 may identify the monitored audio streams by first matching a monitored signature to a reference signature. The match information and/or the matching reference signature is then used to retrieve identification information (e.g., a song title, a song track, an artist, etc.) from a database stored in the memory 134.

Although one monitoring site (e.g., the monitoring site 152) is shown in FIG. 1B, multiple monitoring sites may be communicatively coupled to the network 108 and configured to generate monitored signatures. In particular, each monitoring site may be located in a respective broadcast region and configured to monitor the content of the broadcast stations within a respective broadcast region.

Figure 2:
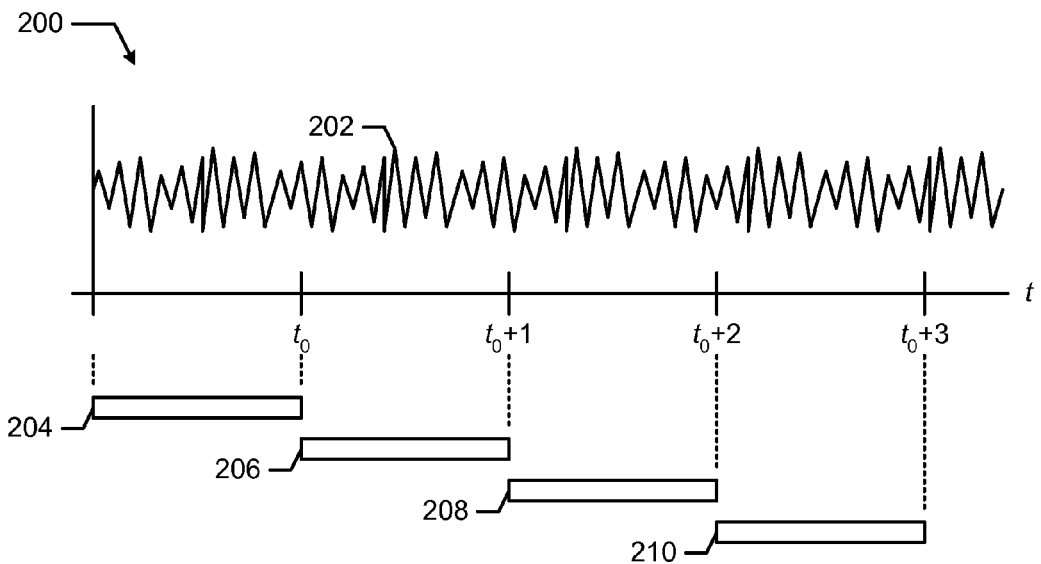
FIG. 2 is a time-domain representation of an example monitored audio stream and a plurality of audio sample frames acquired from the monitored audio stream.

FIG. 2 is a time-domain representation 200 of an example monitored audio stream 202 and a plurality of audio sample frames 204, 206, 208, and 210 acquired from the monitored audio stream 202. A monitored digital spectral signature is generated at a monitoring site (e.g., the monitoring site 102 of FIG. 1A or the monitoring site 152 of FIG. 1B) based on audio samples acquired from the example monitored audio stream 202. The time-domain representation 200 illustrates the time relationship between the example monitored audio stream 202 and the audio sample frames 204, 206, 208, and 210, which are used to generate monitored signatures.

In one example, an N-bit monitored signature $S_x(t)$ is formed using one or more M-bit descriptors $B_x(t_0)$, $B_x(t_0+1)$, $B_x(t_0+2)$, $B_x(t_0+3)$. For example, a 32-bit monitored signature $S_x(t)$ includes four 8-bit descriptors $B_x(t_0)$, $B_x(t_0+1)$, $B_x(t_0+2)$, $B_x(t_0+3)$, each of which is generated based on a corresponding one of the audio sample frames 204, 206, 208, and 210. More specifically, each of the descriptors is generated using one or more intraframe operations (e.g., comparison operations) based on two or more spectral components that are uniquely associated with a single audio sample frame.

The four descriptors may be generated based on spectral decompositions (e.g., frequency decompositions or wavelet decompositions) of the audio sample frames 204, 206, 208, and 210 as described in detail below in connection with FIGS. 4-7. The spectral decompositions are used to extract features that are uniquely characteristic of the example monitored audio stream 202. In this manner, a reference signature and a monitored signature that are generated based on the same audio stream using the same signature generation method (e.g., the same spectral decomposition-based method) will include similar features, and, thus can be used to reliably identify the monitored audio stream 202 using a matching algorithm. A monitored signature may be generated by sampling the example monitored audio stream 202 to generate the audio sample frames 204, 206, 208, and 210, generating the descriptors $B_x(t_0)$, $B_0(t_0+1)$, $B_x(t_0+2)$, $B_x(t_0+3)$ based on spectral decompositions of the audio sample frames 204, 206, 208, and 210, and concatenating the descriptors.

The audio sample frames 204, 206, 208, and 210 are generated by sampling the example monitored audio stream 202 during four time intervals at a sampling frequency $f_s$. For example, a sampling frequency $f_s$ of 6000 Hz will generate 6000 samples of audio data for each of the audio sample frames 204, 206, 208, and 210 (assuming the sample frames are collected over one second intervals). However, any other suitable sampling frequency $f_s$ may instead be selected. As shown in FIG. 2, the duration of each of the audio sample frames 204, 206, 208, and 210 is one second (e.g., 0 to $t_0$, $t_0$ to $t_0+1$, $t_0+1$ to $t_0+2$, and $t_0+2$ to $t_0+3$). However, the duration may instead be set to any other length of time. The times within the monitored audio stream 202 during which monitored signatures are generated are substantially similar or identical to the times within a reference audio stream during which corresponding reference signatures are generated. By acquiring audio sample frames for monitored signatures and reference signatures at substantially the same times, the features extracted from a monitored audio stream (e.g., the example monitored audio stream 202) and a corresponding reference audio stream (e.g., the example reference audio stream 302 of FIG. 3) are substantially similar or identical. Although the audio sample frames 204, 206, 208, and 210 are shown in FIG. 2 as occurring consecutively in time, the audio sample frames 204, 206, 208, and 210 may occur at any time and in any sequence within the example monitored audio stream 202.

To ensure that the monitored signature is compared with a reference signature that is generated at substantially the same time within respective audio streams, the monitored signatures may be generated relative to a reference time that is used during the signature comparison process to align a monitored signature with a reference signature. More specifically, during the generation of a monitored signature, the example monitored audio stream 202 is sampled starting at a time indicated by a reference time $t_0$, which may be selected relative to a time stamp embedded within the example audio stream 202, a system startup time, a daily recurring time (e.g., midnight), and/or any other reference time that may be indicative of the time at which a signature is generated. A signature matching system (e.g., the signature analyzer 132 of FIGS. 1A and 1B) uses the reference time $t_0$ to retrieve one or more reference signatures that correspond to substantially the same time within reference audio streams as indicated by the reference time $t_0$.

Additionally, one or more monitored signatures may be generated using the example monitored audio stream 202 so that multiple signatures are matched to identify the example monitored audio stream 202. For example, it is possible that one or more monitored signatures generated using the example monitored audio stream 202 are substantially similar or identical to one or more reference signatures of a reference audio stream (e.g., the example reference audio stream 302 of FIG. 3) that does not correspond to the example monitored audio stream 202. In this case, to decrease the possibility of erroneously identifying the wrong reference audio stream, more than one monitored signature is generated for the monitored audio stream 202. More specifically, the signatures may be generated at multiple times throughout the example monitored audio stream 202. In addition, a comparison algorithm may be configured to match two or more monitored signatures with corresponding reference signatures to accurately identify the example monitored audio stream 202.

Figure 3:
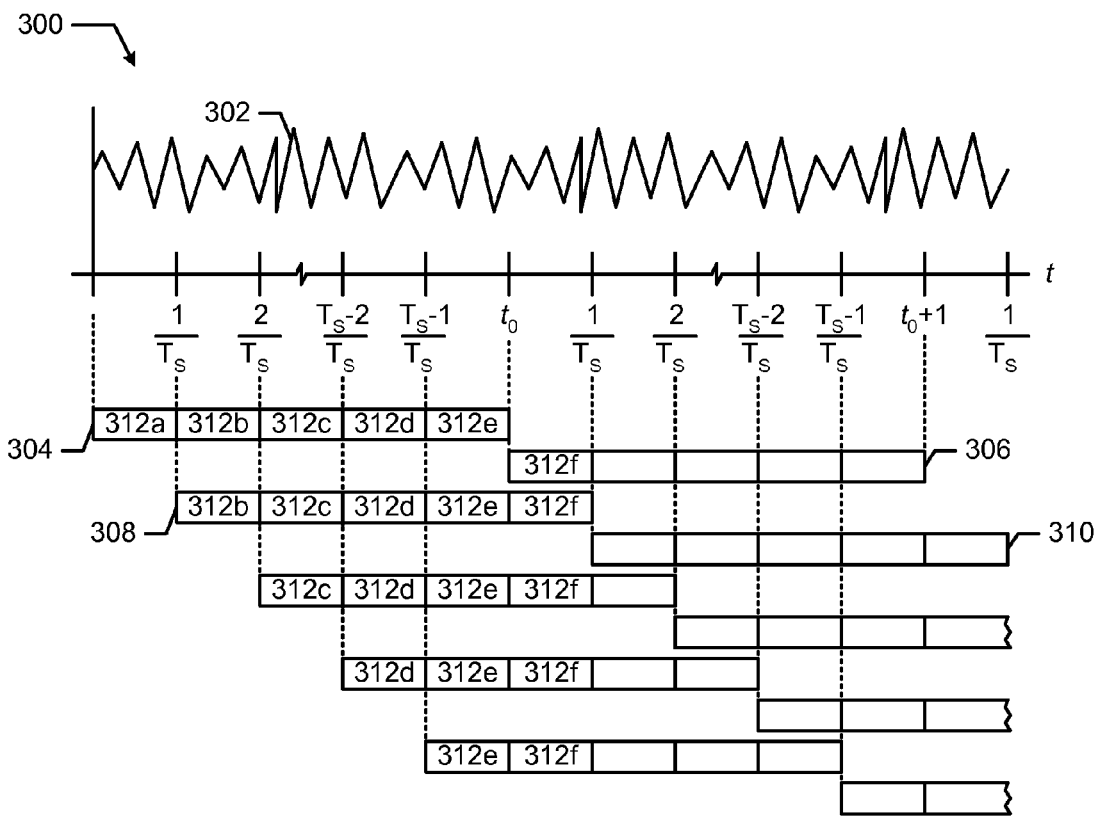
FIG. 3 is a time-domain representation of an example reference audio stream and a plurality of audio sample frames acquired from the example reference audio stream.

FIG. 3 is a time-domain representation 300 of an example reference audio stream 302 and a plurality of audio sample frames 304, 306, 308, and 310 that may be acquired from the example reference audio stream 302. The time-domain representation 300 shows two one second time intervals (e.g., 0 to $t_0$ and $t_0$ to $t_0+1$) and the plurality of audio sample frames 304, 306, 308, and 310 that are collected during the time intervals and that are subsequently used to generate a plurality of reference signatures that are staggered in time (i.e., time shifted relative to one another). The example reference audio stream 302 is sampled at a sampling frequency $f_s$ to collect the audio sample frames 304, 306, 308, and 310, which are used to generate M-bit descriptors $B_{Rn}(t)$. One or more of the descriptors $B_{Rn}(t)$ may then be concatenated to form an N-bit reference signature $S_{Rn}(t)$. Typically, the number of descriptors in a reference signature is equal to the number of descriptors in a monitored signature. Additionally, each of the M-bit descriptors $B_{Rn}(t)$ includes the same number of bits as a corresponding M-bit descriptor $B_x(t)$ associated with the example monitored audio stream 202 (FIG. 2) and, thus, each N-bit reference signature $S_{Rn}(t)$ includes the same number of bits as a corresponding N-bit monitored signature $S_x(t)$.

Multiple reference signatures are generated for the example reference audio stream 302 in a manner that causes the reference signatures to be time-shifted relative to each other and to overlap in time with one another. More specifically, the start time at which a first audio sample frame (e.g., the audio sample frame 304) of a first reference signature is collected is offset, or shifted, by an amount of time $$\frac{1}{T_s}$$

from the start time at which a first audio sample frame (e.g., the audio sample frame 308) of a second reference signature is collected. The value $T_S$ is associated with a number of equal segments ("sample segments") into which each time interval (e.g., $t_0$ to $t_0+1$) is divided. For example, if the number of sample segments $T_S$ in a time interval of one second is set equal to thirty, the collection of a new data set will begin every $$\frac{1}{30}\text{-}th$$

of a second. In addition, if the sampling frequency $f_s$ is set equal to 6000 Hz, each sample segment will include 200 samples.

Each audio sample frame is used to generate a single signature. More specifically, an audio sample frame is collected using a predetermined number of sample segments (e.g., the sample segments 312*a*-312*e*), which are concatenated to form the audio sample frame (e.g., the audio sample frame 304). To achieve overlap among consecutively generated signatures, each signature is formed using an audio sample frame that partially overlaps with an audio sample frame used to form the previously generated signature. More specifically, two audio sample frames that overlap include a common set of sample segments. For example, the audio sample frames 304 and 308 include a common set of sample segments comprising the sample segments 312*b*-312*e*. The audio sample frame 308 may be formed by extracting a common plurality of media samples or the common set of sample segments 312*b*-312*e* from the audio sample frame 304 and appending a recently acquired sample segment (e.g., the sample segment 312*f*) to the common set of sample segments 312*b*-312*e*. In addition, two audio sample frames that overlap also contain sample segments that are exclusive to one or the other of the audio sample frames (i.e., audio sample frames that overlap also contain sample segments that occur in one or the other of the audio sample frames but do not occur in both frames).

To further illustrate the generation of reference signatures that are time shifted and overlapped, each reference signature is formed by four reference descriptors $$B_{Rn}\left(t_0 + \frac{k}{T_s}\right), B_{Rn}\left(t_0 + \frac{k}{T_s} + 1\right), B_{Rn}\left(t_0 \frac{k}{T_s} + 2\right), B_{Rn}\left(t_0 + \frac{k}{T_s} + 3\right).$$

The four reference descriptors are separated by one-second time intervals and are shifted by $$\frac{k}{T_s}$$

seconds with respect to the reference time $T_0$, where $0 \leq k < T_S$. For example, the audio sample frames 304 and 306 (generated at $$t_0 + \frac{0}{T_s} \text{ and } t_0 + \frac{0}{T_s} + 1\bigg),$$

respectively, in combination with two other audio sample frames generated at $$t_0 + \frac{0}{T_s} + 2 \text{ and } t_0 + \frac{0}{T_s} + 3$$

(not shown), are used to generate four descriptors that form a first reference signature. Additionally, the audio sample frames 308 and 310 (generated at $$\left(t_0 + \frac{1}{T_s}\right) \text{ and } \left(t_0 + \frac{1}{T_s} + 1\right)\bigg),$$

respectively, are used with two other audio sample frames generated at $$\left(t_0 + \frac{1}{T_s} + 2\right) \text{ and } \left(t_0 + \frac{1}{T_s} + 3\right)$$

(not shown) to generate four descriptors that form a second reference signature that is time shifted relative to the first reference signature by $$\frac{1}{T_s}$$

seconds. As described below in connection with FIG. 5, each of the reference descriptors is generated using one or more operations (e.g., comparison operations) based on two or more spectral components that are both associated with the same audio sample frame. These operations are referred to as intraframe operations because they are performed using data exclusive to a single audio frame and are not dependent on sample data collected over other audio frames.

During an example sample acquisition process, the sample segments 312a-312e are collected and are used to form the first audio sample frame 304, which is subsequently used to determine a descriptor. This descriptor is then used to form part of a first reference signature. Then, a new sample segment 312f is collected and a second audio sample frame 308 is formed using sample segments 312b-312f. The second audio sample frame 308 is then used to determine a reference descriptor which is used to form part of a second reference signature. Thus, the first and second audio sample frames 304 and 308 include a common set of sample segments 312b-312e and each of the first and second audio sample frames additionally include a sample segment not included in the other (i.e., the first audio sample frame 304 includes sample segment 312a and the second audio sample frame 308 includes sample segment 312f). In this manner, the first and second reference signatures are generated using data collected at points in the audio stream that are staggered or shifted in time by $$\frac{1}{T_s}$$

seconds and are generated using data that overlaps. In addition, the amount by which the first and second signatures are shifted can be adjusted by changing the value of $T_S$ thereby permitting the resolution of the signatures to vary as desired. Specifically, if a set of signatures that represents an audio stream with a greater resolution is desired, $T_S$ can be increased accordingly. Likewise, if less resolution is desired, $T_S$ can be decreased. As will be appreciated by one having ordinary skill in the art, the value of $T_S$ may affect the quantity of signatures that can be generated for a given audio stream. For example, if the number of sample segments used to form a signature remains constant, a larger value of $T_S$ will result in forming more audio sample frames than a smaller value of $T_S$. Therefore, the amount of memory available to store the signature data may be a factor in determining the desired value of $T_S$.

As described above, in order to identify the title of a song or the title of a program associated with a particular audio stream, a set of monitored signatures generated for a monitored audio stream are compared to a database of reference signatures associated with a plurality of reference audio streams. In one example system, a signature generator (e.g., the signature generator 114 of FIG. 1A) may be configured to monitor the audio emitted by a specific television (e.g., one of the presentation devices 112 of FIG. 1A) located in the home of a specific panelist. Signatures are generated for the audio emitted by the television in the manner described above. In addition, the time at which the audio corresponding to each signature was emitted is recorded and stored as a reference time $t_0$ with the corresponding monitored signature in a memory device. A timing device (e.g., the timing device 903 of FIGS. 9 and 10) located at the monitoring site may be used to trigger the collection of the audio data for the subsequent generation of monitored signatures and to provide the corresponding data collection times (e.g., reference times $t_0$, timestamps, etc.) to the memory for storage with the corresponding signature. To enable the subsequent identification of the emitted audio, a reference site (e.g., the reference site 104 of FIG. 1A) located within the same broadcast region as a monitoring site (e.g., the monitoring site 102 of FIG. 1A) is configured to generate reference signatures corresponding to the audio broadcast on all television broadcast channels at all times of the day. A timing device (e.g., the timing device 903 of FIGS. 9 and 10) located at the reference site may be used to trigger the collection of the audio data at a set of equally spaced intervals corresponding to the time period $$\frac{1}{T_s}$$

for the subsequent generation of the reference signatures and to provide a corresponding set of data collection times to a reference memory (e.g., the memory 126 of FIG. 1A) for storage. Thus, each reference signature is stored in a memory device located at the reference site along with timestamp data indicating the time at which the underlying audio data was collected. In one example, the timing devices (e.g., the timing device 903 of FIG. 9) located at the monitoring site and the reference site are synchronized such that the timestamps can be used to align the reference signatures with the monitored signatures to facilitate the signature matching process. Likewise, because a plurality of monitoring sites are likely to be located in the same broadcast region as a single reference site, in the same example, each of the timing devices 903 located in each such monitoring site may be synchronized with the timing device 903 located in the single reference site. However, due to the staggered arrangement of the reference signatures described above in connection with FIG. 3, the timing devices 903 at the monitoring site and the reference site do not have to be synchronized.

To compensate for offsets between the timing devices located at the monitoring sites and the reference site, the value of $T_s$ may be adjusted. The value of $T_s$ is generally selected to incrementally time shift a reference signature from a previous reference signature so that a monitored signature generated at an arbitrary reference time is highly likely to align with one of the staggered or time-shifted reference signatures. More specifically, increasing the value of $T_s$ causes the number of sample segments (e.g., the sample segments 312a-312f) to increase and the offset or time shift from one reference signature to the next reference signature to decrease. This, in turn, increases the likelihood that the times at which reference signatures are generated for a given audio stream correspond to substantially similar or identical reference times at which monitored signatures are generated for the same audio stream. Signatures generated at the same times for the same program are expected to be identical or at least similar enough to cause a match to be detected. Thus, increasing the value of $T_s$ increases the likelihood of a match between a set of reference signatures and a set of monitored signatures corresponding to the same audio program. Additionally, assuming the timing devices located at the reference site and the monitoring site are synchronized with sufficient precision, a monitored signature generated for data collected at a time T need only be compared to each reference signature associated with the same timestamp T instead of all reference signatures generated during the same twenty-four hour period. This reduction in comparisons reduces the processing time required to find a match. Similarly, assuming there is a known error, E, between the timing devices located at a monitoring site and a reference site, each monitored signature generated at the monitoring site at a time T need only be compared to all reference signatures generated from data collected within a window of the time spanning from T−E to T+E.

In another example system (e.g., the example audio identification system 150 of FIG. 1B), a set of monitored signatures are generated for a monitored audio stream and then compared to a database of reference signatures associated with a set of reference audio streams that, ideally, represent the universe of currently available audio streams. For example, as described above, in connection with FIG. 1B, reference signatures corresponding to reference audio streams may be stored in a database that is stored in, for example, the memory 134. For each reference signature that is matched to a monitored signature, the matching information and/or the reference signature may be used to retrieve identification information (e.g., song title, song track, artist, etc.) from the database. The identification information is then used to identify the monitored audio stream. In one example, reference times $t_0$ or timestamps associated with each monitored signature may be used to identify the time (of day) at which the monitored audio streams were broadcast.

Figure 4:
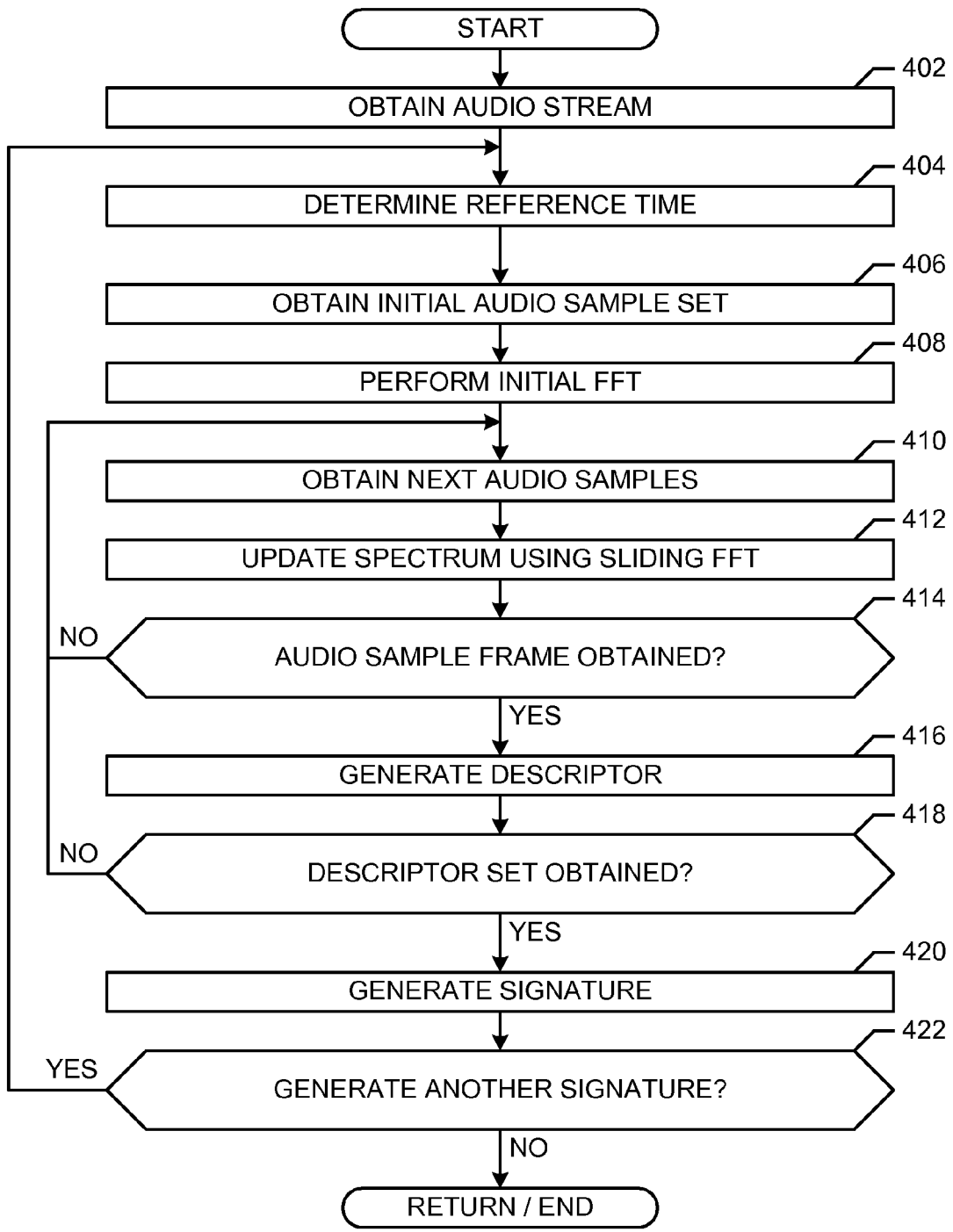
FIG. 4 is a flow diagram of an example method for generating digital spectral signatures based on spectral decompositions.

FIG. 4 is a flow diagram of an example method for generating digital spectral signatures based on spectral decompositions. In particular, the example method of FIG. 4 may be used to generate digital spectral signatures (e.g., reference signatures and/or monitored signatures) based on frequency decomposition methods using a sliding Fast Fourier transform (FFT). As is known by one having ordinary skill in the art, an FFT may be used to convert a time domain signal (e.g., the example audio streams 202 and 302 of FIGS. 2 and 3) into a frequency domain representation of the same signal which may then be used to analyze the frequency components of the converted signal.

As will be appreciated by one having ordinary skill in the art, a sliding FFT provides advantages over a conventional non-sliding FFT for generating the digital spectral signatures. Unlike a conventional non-sliding FFT, a sliding FFT can be used to incrementally compute an FFT. For example, one example approach to processing the audio streams 202 and 302 involves generating FFT data for each audio sample frame independent of any data associated with previous audio sample frames. In contrast, a sliding FFT involves generating FFT data for an audio sample frame by updating the FFT data generated in connection with a previous audio sample frame. Updating the previous frame's FFT data is less computationally expensive than generating FFT data anew for each frame causing the sliding FFT technique to be more efficient than the non-sliding conventional FFT approach. Additionally, the number of samples forming each audio sample frame (e.g., the audio sample frames 204, 206, 208, and 210 of FIG. 2 or 304, 306, 308, and 310 of FIG. 3) need not be a power of two, as is required of the non-sliding FFT approach. Thus, when using a sliding FFT, the digital spectral signatures can be generated using audio sample frames of any arbitrary size (i.e., any number of samples) that are acquired using any sampling frequency $f_s$.

Now turning in detail to the example method of FIG. 4, initially the example method involves obtaining an audio stream (block 402) (e.g., the example monitored audio stream 202 of FIG. 2 or the example reference audio stream 302 of FIG. 3). A reference time to described above in connection with FIGS. 2 and 3 is determined (block 404) to indicate the time within an audio stream at which a signature is generated. An initial audio sample set is then obtained (block 406). The audio samples may be obtained by sampling an analog audio stream at a sampling frequency $f_s$ and performing an analog-to-digital conversion. Alternatively, the audio samples may be obtained by extracting or acquiring samples from a digital audio stream at a sampling frequency $f_s$. The initial audio sample set may be a complete audio sample frame (e.g., one of the audio sample frames 204, 206, 208, and 210 of FIG. 2 or 304, 306, 308, and 310 of FIG. 3) or a portion thereof. An initial FFT operation is performed on the initial audio sample set to establish an initial frequency spectrum (block 408). The method of performing a FFT is well known in the art and, thus, is not discussed in detail herein.

After the initial frequency spectrum is determined (block 408), a next set of audio samples is obtained (block 410). The sliding FFT may then be used to update the initial frequency spectrum (generated at block 408) based on two most recently collected samples $v_{N_s-2}$ and $v_{N_s-1}$ according to Equation 1 below.

$$a_1[J] \times \exp(\varphi_1[J]) = \\ a_0[J] \times \exp(\varphi_0[J]) \times \exp\left(-\frac{i2\pi J(2)}{N_S}\right) + \\ \left(v_{N_S-2} \times \exp\left(\frac{i2\pi J(N_S - 2)}{N_S}\right)\right) + \\ \left(v_{N_S-1} \times \exp\left(\frac{i2\pi J(N_S - 1)}{6000}\right)\right) - \\ \left(v_0 \times \exp\left(-\frac{i2\pi J(2)}{N_S}\right)\right) - \left(v_1 \times \exp\left(-\frac{i2\pi J}{N_S}\right)\right)$$

Equation 1

Equation 1 may be used to update the frequency spectrum of an audio sample frame having a sample quantity $N_S$. The spectral amplitude $a_0[J]$ and phase value $\phi_0[J]$ form the existing frequency spectrum $a_0[J] \times \exp(\phi_0[J])$, which includes the frequencies indexed by the frequency index J. When the two most recently collected audio samples $v_{N_s-2}$ and $v_{N_s-1}$ are obtained, the existing frequency spectrum $a_0[J] \times \exp(\phi_0[J])$ may be updated to determine a new frequency spectrum $a_1[J] \times \exp(\phi_1[J])$. The two most recently collected audio samples $v_{N_s-2}$ and $v_{N_s-1}$ are inserted into the audio sample frame to replace the two earliest collected samples $v_0$ and $v_1$.

As shown in Equation 1, the updated frequency spectrum $a_1[J] \times \exp(\phi_1[J])$ is determined using one or more multiplication operations, addition operations, and subtraction operations based on complex exponents, the two earliest collected samples $v_0$ and $v_1$, and the two most recently collected samples $v_{N_s-2}$ and $v_{N_s-1}$. Initially, the existing frequency spectrum $a_0[J] \times \exp(\phi_0[J])$ is multiplied by a first complex exponential value $$\exp\left(-\frac{i2\pi J(2)}{N_S}\right).$$

The product of the multiplication is added to a product determined by multiplying the first most recently collected audio sample $v_{N_s-2}$ by a second complex exponential value $$\exp\left(\frac{i2\pi J(N_S - 2)}{N_S}\right).$$

The result is then added to a product determined by multiplying the second most recently collected audio sample $v_{N_s-1}$ by a third complex exponential value $$\exp\left(\frac{i2\pi J(N_S - 1)}{N_S}\right).$$

The first earliest collected audio sample $v_0$ is then multiplied by the first complex exponential value $$\exp\left(-\frac{i2\pi J(2)}{N_S}\right)$$

and subtracted from the previous addition result. The second earliest collected audio sample $v_1$ is then multiplied by a fourth complex exponential value $$\exp\left(-\frac{i2\pi J}{N_S}\right)$$

and subtracted from the previous subtraction result.

It is well known in the art that instabilities such as, for example, oscillation or data overflow can be substantially minimized when implementing a sliding FFT by multiplying most recently collected audio samples (e.g., the most recently collected audio samples $v_{N_s-2}$ and $v_{N_s-1}$) by a first stability factor $sf_1$ and earliest collected audio samples (e.g., the earliest collected audio samples $v_0$ and $v_1$) by a second stability factor $sf_2$. The first stability factor $sf_1$ may be set equal to a value as close as possible to one. In the case of an audio sample frame having 6000 samples, the first stability factor $sf_1$ may be set equal to 0.99995. The second stability factor $sf_2$ may be set equal to $(sf_1)^{p-1}$, where the value p is equal to the number of sample shifts required to process an audio sample frame using the sliding FFT. For example, a two-sample shift is required to update an audio sample frame based on the two most recently collected audio samples $v_{N_s-2}$ and $v_{N_s-1}$. In the case of the audio sample frame having 6000 samples, the value p may be set equal to 3000.

After the sliding FFT is determined or calculated at block 412, it is determined if a complete audio sample frame (e.g., one of the audio sample frames 204, 206, 208, and 210 of FIG. 2 or one of the audio sample frames 304, 306, 308, and 310 of FIG. 3) has been obtained (block 414). At the monitoring sites 102 (FIG. 1A) and 152 (FIG. 1B), a complete audio sample frame is obtained when a plurality of most recently collected $N_S$ samples is obtained. For example, if an audio sample frame includes 6000 samples, a complete audio sample frame is obtained after 6000 new samples are obtained. At the reference site 104 (FIG. 1A) or the central data collection facility 154 (FIG. 1B), a complete audio sample frame is obtained when a most recently collected sample segment (e.g., one of the sample segments 312a-312f of FIG. 3) is obtained and a current audio sample frame is formed as described in greater detail above in connection with FIG. 3. If it is determined at block 414 that a complete audio sample frame has not been obtained, control is passed back to block 410. However, if it is determined at block 414 that a complete audio sample frame has been obtained, a descriptor is generated (block 416). An example method for generating descriptors based on frequency components is described in greater detail below in connection with FIG. 5.

It is then determined if a complete descriptor set has been obtained (block 418). A descriptor set includes a predetermined number of descriptors that are used to form a signature. For example, if a 32-bit signature is formed by 8-bit descriptors, then a descriptor set includes four descriptors. If it is determined at block 418 that a complete descriptor set has not been obtained, control is passed back to block 410. However, if it is determined at block 418 that a complete descriptor set has been obtained, a digital spectral signature is generated by concatenating the descriptors of the descriptor set (block 420). After the digital spectral signature is generated (block 420), it is determined if another signature is to be generated (block 422). If another signature is to be generated, control is passed back to block 404.

Figure 5:
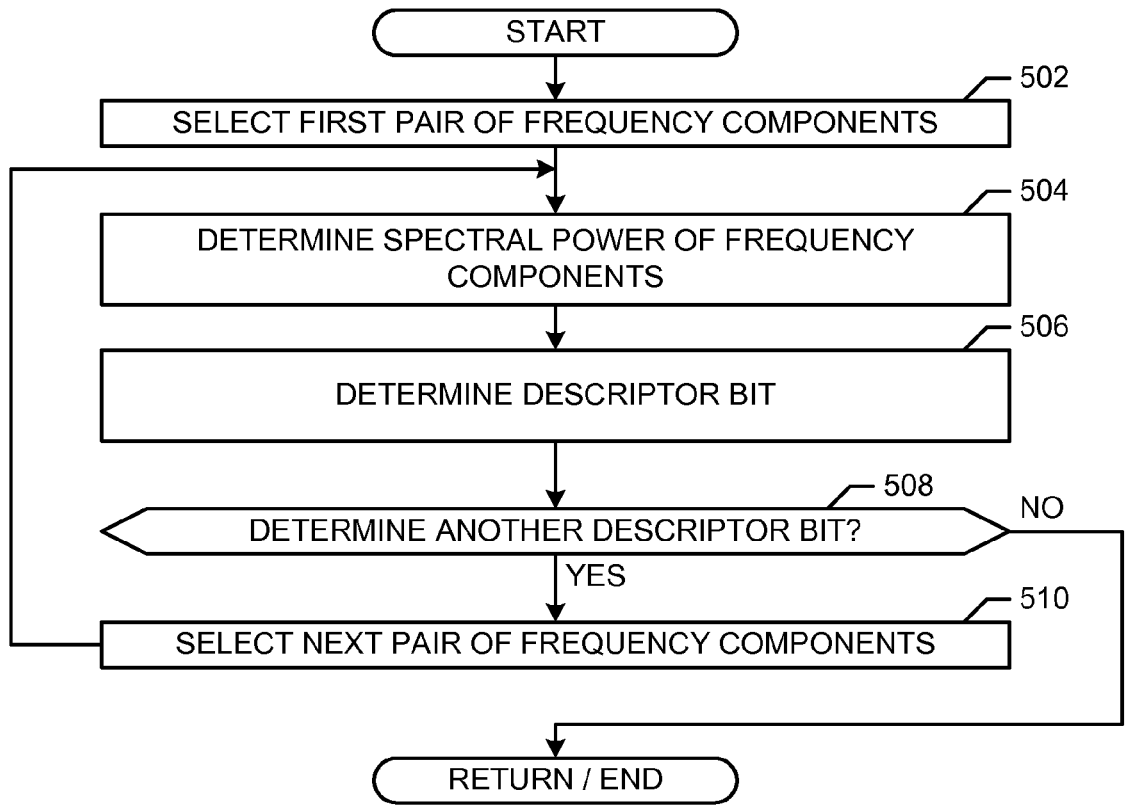
FIG. 5 is a flow diagram of an example method for generating descriptors associated with the example method of FIG. 4.

FIG. 5 is a flow diagram of an example method for generating descriptors associated with the example method of FIG. 4. In particular, the example method of FIG. 5 may be used to implement block 416 of FIG. 4. An M-bit descriptor is generated by selecting M pairs of frequency components $f_{lb}$ that are uniquely associated with an audio sample frame and determining each bit of the descriptor based on intraframe comparisons of the spectral powers $P_{lb}$ of the frequency components $f_{lb}$. The frequency components $f_{lb}$ and the spectral powers $P_{lb}$ are indexed by a frequency component index l and a bit index b, where $0 \leq l < f\ index_{max}$ and $0 \leq b < M$.

The example method initially selects a first pair of frequency components $f_{00}$ and $f_{10}$ (block 502). Although consecutive frequency components are selected (i.e., $f_{0b}$ and $f_{1b}$, $f_{2b}$ and $f_{3b}$, etc.) in the example method, the frequency components may be selected from any location in the frequency spectrum of an audio sample frame (e.g., one of the audio sample frames 204, 206, 208, and 210 of FIG. 2 or one of the audio sample frames 304, 306, 308, and 310 of FIG. 3). However, the frequency component indexes l used to select pairs of frequency components for generating a monitored signature are the same frequency component indexes l used to select pairs of frequency components for generating a corresponding reference signature.

After the first pair of frequency components $f_{00}$ and $f_{10}$ is selected, the spectral powers $P_{00}$ and $P_{10}$ corresponding to the selected frequency components are determined (block 504). One of ordinary skill in the art will readily appreciate that the spectral power for each frequency component can be obtained based on the results of the sliding FFT performed at block 412 of FIG. 4.

A descriptor bit is determined based on the frequency components $f_{00}$ and $f_{10}$ by comparing the first spectral power $P_{00}$ with the second spectral power $P_{10}$ (block 506). If the first spectral power is greater than the second spectral power (i.e., $P_{00} > P_{10}$), the descriptor bit is set equal to one. If, instead, the first spectral power is less than or equal to the second spectral power (i.e., $P_{00} \leq P_{10}$), the descriptor bit is set equal to zero.

It is then determined if another descriptor bit is to be determined (block 508). If another descriptor bit is to be determined, another pair of frequency components is selected (e.g., $f_{21}$ and $f_{31}$) (block 510) and control is passed back to block 504. If, instead, another descriptor bit is not to be determined, the example method of FIG. 5 may be stopped.

Figure 6:
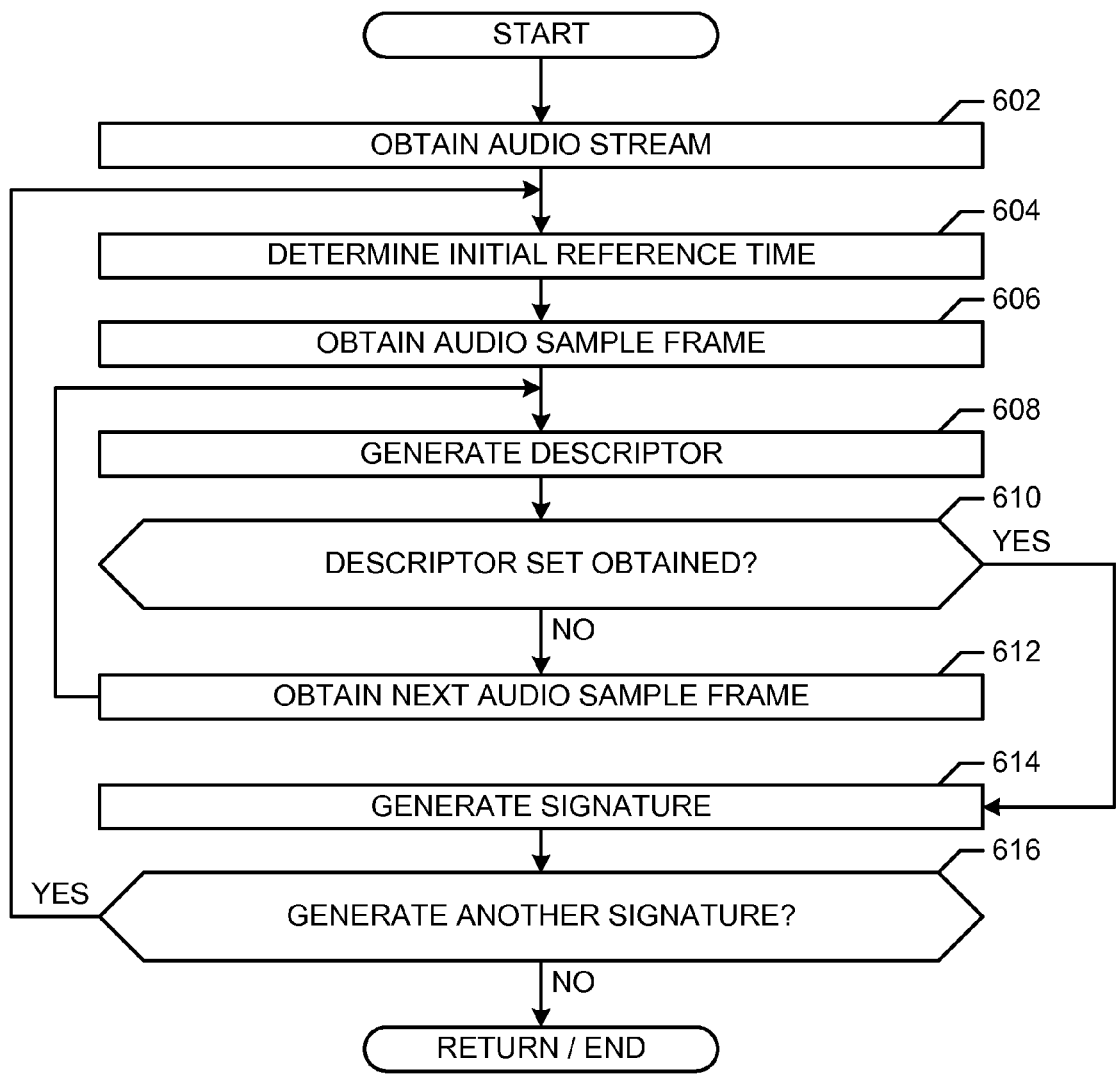
FIG. 6 is a flow diagram of another example method for generating digital spectral signatures based on spectral decompositions.

FIG. 6 is a flow diagram of another example method for generating digital spectral signatures based on spectral decompositions. In particular, the example method of FIG. 6 may be used to generate digital spectral signatures (e.g., reference signatures and monitored signatures) based on wavelet decompositions of audio sample frames (e.g., the audio sample frames 204, 206, 208, and 210 of FIG. 2 or 304, 306, 308, and 310 of FIG. 3) using wavelet transforms. As described above, wavelet transforms may be employed to analyze data using different scales and/or resolutions by separating blocks or frames of data (e.g., the audio sample frames 204, 206, 208, 210, 304, 306, 308, and 310) into multiple sub-bands.

Initially, the example method obtains an audio stream (block 602) (e.g., the example monitored audio stream 202 of FIG. 2 or the example reference audio stream 302 of FIG. 3). A reference time to described above in connection with FIGS. 2 and 3 is determined (block 604) to indicate the time within an audio stream at which a signature is generated. An audio sample frame is then obtained (block 606). The audio sample frame may be obtained by sampling an analog audio stream at a sampling frequency $f_s$ and performing an analog-to-digital conversion. Alternatively, the audio sample frame may be obtained by extracting or acquiring samples from a digital audio stream at a sampling frequency $f_s$. Based on the Nyquist Theorem, aliasing is avoided by sampling the audio samples at frequencies ranging from zero to $$\frac{f_s}{2}.$$

A descriptor is then determined (block 608) based on wavelet decomposition performed using a wavelet transform. An example method for generating descriptors based on one or more wavelet decompositions is described in greater detail below in connection with FIG. 7.

After the descriptor is generated, it is determined if a complete descriptor set has been obtained (block 610). If a complete descriptor set has not been obtained, a next audio sample frame is obtained (block 612) and control is passed back to block 608. However, if a complete descriptor set has been obtained, a digital spectral signature is generated (block 614) by concatenating the descriptors of the descriptor set. After the digital spectral signature is generated, it is determined if another signature is to be generated (block 616). If another signature is to be generated, control is passed back to block 604. Otherwise, the example method is stopped.

Figure 7:
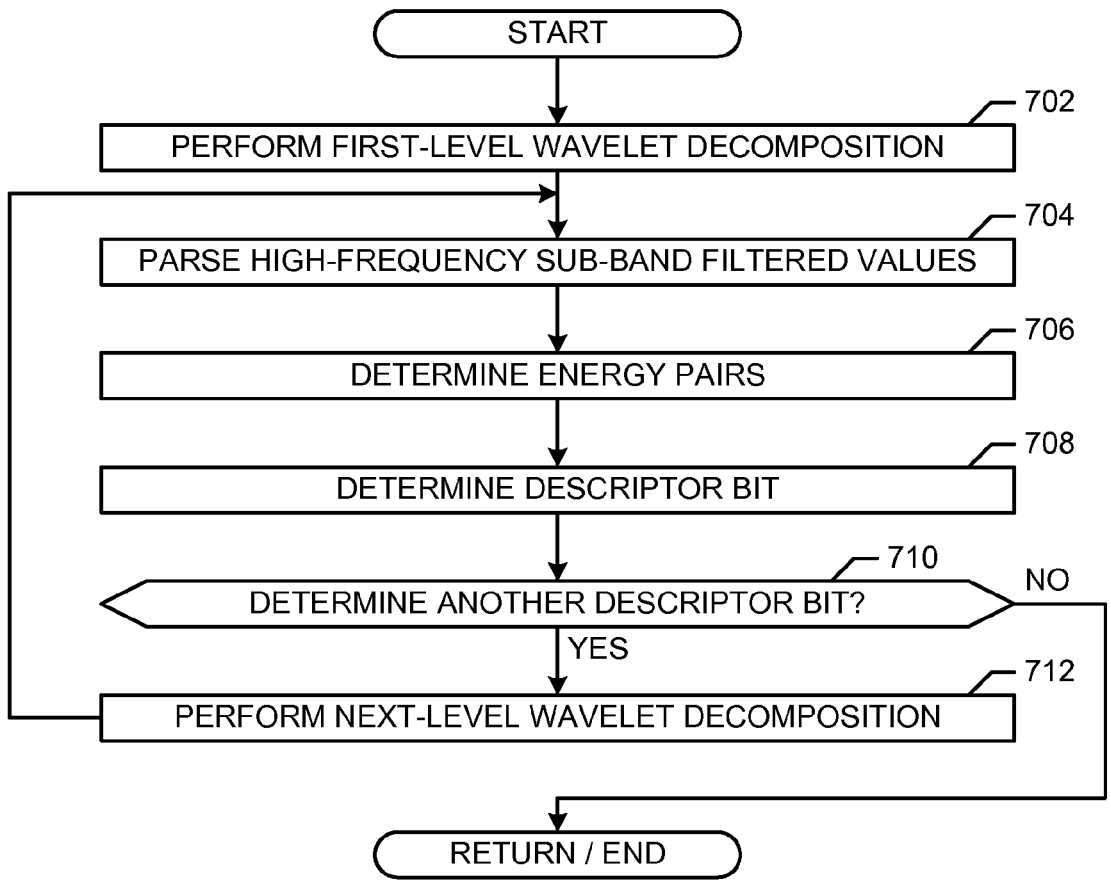
FIG. 7 is a flow diagram of an example method for generating descriptors associated with the example method of FIG. 6.

FIG. 7 is a flow diagram of an example method for generating descriptors associated with the example method of FIG. 6. In particular, the example method of FIG. 7 may be used to implement block 608 of FIG. 6. An M-bit descriptor is generated by performing an M-level wavelet decomposition on an audio sample frame (e.g., one of the audio sample frames 204, 206, 208, and 210 of FIG. 2 or one of the audio sample frames 304, 306, 308, and 310 of FIG. 3). For each level wavelet decomposition, the energy of the audio signal for each sub-band is determined and descriptors are generated based on comparisons of the sub-band energies. For each descriptor, the M-level wavelet decomposition is implemented as an intraframe operation that is performed on spectral energies that are uniquely associated with an audio sample frame. Additionally, the M-level wavelet decomposition may be implemented using any wavelet transform. For purposes of clarity, the example method of FIG. 7 is described in terms of the well-known Daubechies wavelet transform.

Initially, the example method performs a first-level wavelet decomposition (block 702) by applying the Daubechies wavelet transform to an audio sample frame. The first application of the Daubechies wavelet transform results in a low-frequency sub-band block of filtered values $L_0$ and a high-frequency sub-band block of filtered values $H_0$, each of which includes $$\frac{N_S}{2}$$

filtered values.

Turning in greater detail to the Daubechies wavelet transform implementation, the Daubechies coefficients $c_0$, $c_1$, $c_2$, and $c_3$ are used to generate an $N_S \times N_S$ transformation matrix in which the coefficients are arranged as shown below.

$$\begin{bmatrix} c_0 & c_1 & c_2 & c_3 & & & & \\ c_3 & -c_2 & c_1 & -c_0 & & & & \\ & & c_0 & c_1 & c_2 & c_3 & & \\ & & c_3 & -c_2 & c_1 & -c_0 & & \\ & & & & & & & \\ & & & & c_0 & c_1 & c_2 & c_3 \\ & & & & c_3 & -c_2 & c_1 & -c_0 \\ c_2 & c_3 & & & & & c_0 & c_1 \end{bmatrix}$$

The coefficients are ordered in the transformation matrix, as shown above, using two dominant patterns. The odd rows include the first pattern, which is an ordering of the coefficients that functions as a smoothing filter (e.g., similar to a moving filter). The even rows include the second pattern, which is an ordering of the coefficients that functions to bring out the details of data (e.g., the audio sample frame). The transformation matrix is first applied to the entire audio sample frame (e.g., all of the $N_S$ samples) to generate filtered values that include low-frequency sub-band filtered values alternated with high-frequency sub-band filtered values. The values are de-interleaved to generate the two sub-band blocks $L_0$ and $H_0$, each of which includes $$\frac{N_S}{2}$$

samples. The low-frequency sub-band block $L_0$ includes filtered values that are associated with sub-band frequencies ranging from zero to $$\frac{f_s}{4}.$$

The high-frequency sub-band block $H_0$ includes filtered values that are associated with sub-band frequencies ranging from $$\frac{f_s}{4} \text{ to } \frac{f_s}{2}.$$

An $$\frac{N_S}{2} \times \frac{N_S}{2}$$

transformation matrix of the Daubechies coefficients is then applied to the low-frequency sub-band block $L_0$ to generate two additional sub-band blocks $L_1$ and $H_1$. For each transformation, the number of filtered values in each sub-band block is halved. Additionally, for each transformation, a descriptor is generated based on a high-frequency sub-band block (e.g., $H_0$, $H_1$, $H_2$, etc.). Further details related to the implementation of wavelet transforms are well known in the art and are not described herein.

After the first-level wavelet transform is applied, the high-frequency sub-band block $H_0$ is parsed by separating the filtered values into a first half and a second half (block 704). Next, at a block 706, a first energy value $E_0$ is determined by squaring and summing the filtered values of the first half of the high-frequency sub-band block $H_0$ and a second energy value $E_1$ is also determined (block 706) by squaring and summing the filtered values of the second half of the high-frequency sub-band block $H_0$.

A descriptor bit is determined by comparing the first energy value $E_0$ with the second energy value $E_1$ (block 708). For example, if the first energy value $E_0$ is greater than the second energy value $E_1$ (i.e., $E_0 > E_1$), the first descriptor bit is set equal to one. If the first energy value $E_0$ is less than or equal to the second energy value $E_1$ (i.e., $E_0 \leq E_1$), the first descriptor bit is set equal to zero. It is then determined if another descriptor bit is to be determined (block 710). If another descriptor bit is to be determined, a next-level wavelet decomposition is performed (block 712). For example, as described above, if a second-level wavelet decomposition is performed, an $$\frac{N_S}{2} \times \frac{N_S}{2}$$

transformation matrix is applied to the filtered values of the low-frequency sub-band block $L_0$ to determine filtered sub-band blocks $L_1$ and $H_1$. If it is determined at block 710 that another descriptor bit is not to be determined, the example method of FIG. 7 may be stopped.

Figure 8:
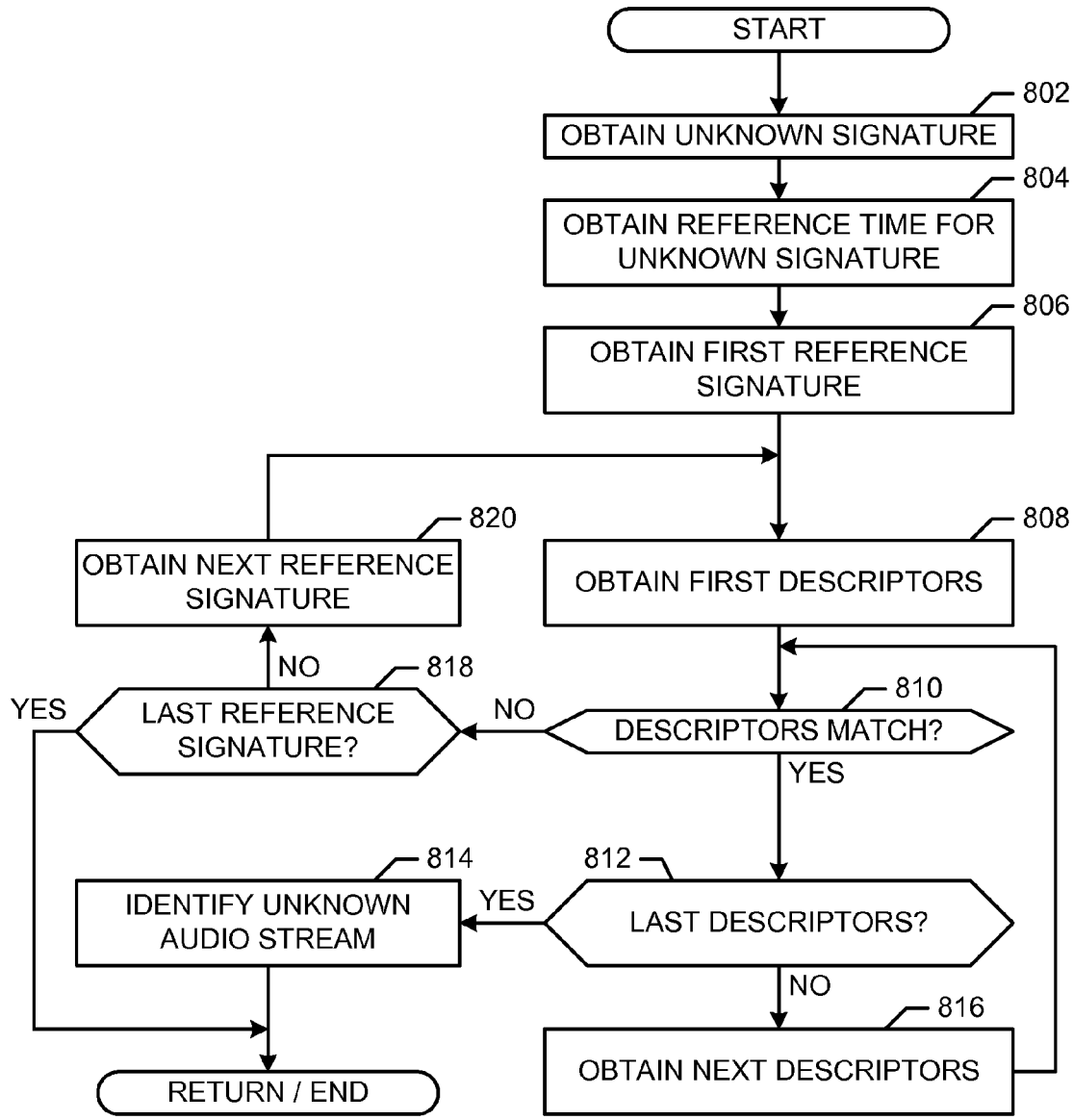
FIG. 8 is a flow diagram of an example method for comparing the digital spectral signatures generated using the example methods of FIGS. 4-7.

FIG. 8 is a flow diagram of an example method for comparing the digital spectral signatures (e.g., monitored signatures and reference signatures) generated using the example methods of FIGS. 4-7. In particular, the example method may be used to compare a monitored signature with a reference signature, both of which are generated based on a sliding FFT or a wavelet transform. In general, the example method of FIG. 8 may be used to match a monitored signature with a reference signature by comparing the monitored signature with a plurality of reference signatures. Identification information (e.g., channel, program title, episode number, etc.) associated with a matching reference signature may then be retrieved from, for example, a database and used to generate media ratings information. The comparisons may be performed by comparing any number of bits from a monitored signature with the same number of bits from a reference signature such as, for example, a bit-by-bit comparison, a byte-by-byte comparison, a word-by-word comparison, etc. Due to the large number of reference signatures available for comparison, a Hamming distance may be used for the comparisons to eliminate mismatches rapidly, thereby significantly decreasing the time required to compare a monitored signature with the reference signatures.

As is known to one of ordinary skill in the art, a Hamming distance between two values may be identified by determining how many bits, numbers, characters, etc. need to be changed to make the two values equal. For example, a first binary value of 0110 and a second binary value of 0101 have a Hamming distance of two because bit location zero and bit location one need to be changed to make the first binary value equal to the second binary value.

Now turning in detail to the example method of FIG. 8, the example method involves first obtaining a monitored signature (block 802). A reference time to for the monitored signature is then obtained (block 804). A first reference signature corresponding to a time within a reference audio stream indicated by the reference time to is obtained from, for example, the memory 134 of FIGS. 1A and 1B (block 806). The first descriptor of the monitored signature and the first descriptor of the reference signature are then obtained (block 808).

The first descriptor of the monitored signature is compared to the first descriptor of the reference signature to determine if the descriptors match (block 810). If a match is detected, it is determined if all of the descriptors of the monitored signature and the reference signature have been compared (block 812). If it is determined at block 812 that all of the descriptors have not been compared, the next descriptors are obtained from the monitored signature and the reference signature (block 816) and control is passed back to block 810. If it is determined at block 812 that all of the descriptors have been compared, the monitored audio stream is identified based on the matching reference signature (block 814). Alternatively, the example method may be implemented so that multiple monitored signatures of a single audio stream need to be matched to multiple signatures of a reference audio stream prior to identifying the monitored audio stream.

If it is determined at block 810 that the descriptors do not match, then it is determined if all of the reference signatures has been compared (block 818). If all of the reference signatures have not been compared, the next reference signature is obtained (block 820) and control is passed to block 808. However, if it is determined at block 818 that all of the reference signatures have been compared, the media, channel, radio station, etc. associated with the monitored audio stream may be unidentifiable and the example method is stopped. A flag may be set to indicate that the monitored audio stream is unidentifiable.

Although, the example method of FIG. 8 is described as comparing one reference signature at a time, the example method can be adapted to compare multiple reference signatures with one monitored signature in parallel (i.e., at the same time). For example, the operation of block 806 may be configured to obtain a plurality of reference signatures at one time, each of which corresponds to a different reference audio stream. The operation of block 808 may be configured to obtain the first descriptor of each of the plurality of reference signatures retrieved at block 806. The descriptors of each of the reference signatures may be compared with the each descriptor of the monitored signature until a match is found or until the plurality of reference signatures obtained at block 806 is eliminated, after which time another plurality of reference signatures may be obtained at block 820.

One of ordinary skill in the art can readily appreciate that applying the Hamming distance to the comparison process may significantly reduce the time required to match all of the available reference signatures. For example, after the first descriptor of each of a plurality of reference signatures are compared to the first descriptor of a monitored signature, the first descriptor of each of the reference signatures is associated with a Hamming distance. Only reference signatures having first descriptors associated with a Hamming distance less than a predetermined Hamming distance threshold are further compared with the monitored signature based on the next descriptor of each of the reference signatures and the monitored signature. Reference signatures having descriptors associated with a Hamming distance greater than a predetermined threshold are discarded. The number of reference signatures to be compared based on the next descriptors is reduced from the number of reference signatures compared to the monitored signature based on the first descriptor. In this manner, with each iteration of the comparison process, the number of reference signatures that remain to be compared in subsequent iterations of the signature comparison process quickly diminishes until it is determined that all of the descriptors of a single reference signature are associated with a Hamming distance below the predetermined Hamming distance threshold.

In instances where all of the descriptors of more than one reference signature are associated with a Hamming distance below the predetermined Hamming distance threshold, more than one monitored signature may need to be matched with respective reference signatures of the possible matching reference audio streams. It will be relatively unlikely that all of the monitored signatures generated based on the monitored audio stream will match all of the reference signatures of more than one reference audio stream, and, thus erroneously matching more than one reference audio stream to the monitored audio stream can be prevented.

The example methods described above in connection with FIGS. 4-8 may be implemented by hardware, software, and/or any combination thereof. More specifically, the example methods may be executed in hardware defined by the block diagrams of FIGS. 9-11. The example methods may also be implemented by software executed on a processor system such as, for example, the processor system 1210 of FIG. 12.

Figure 9:
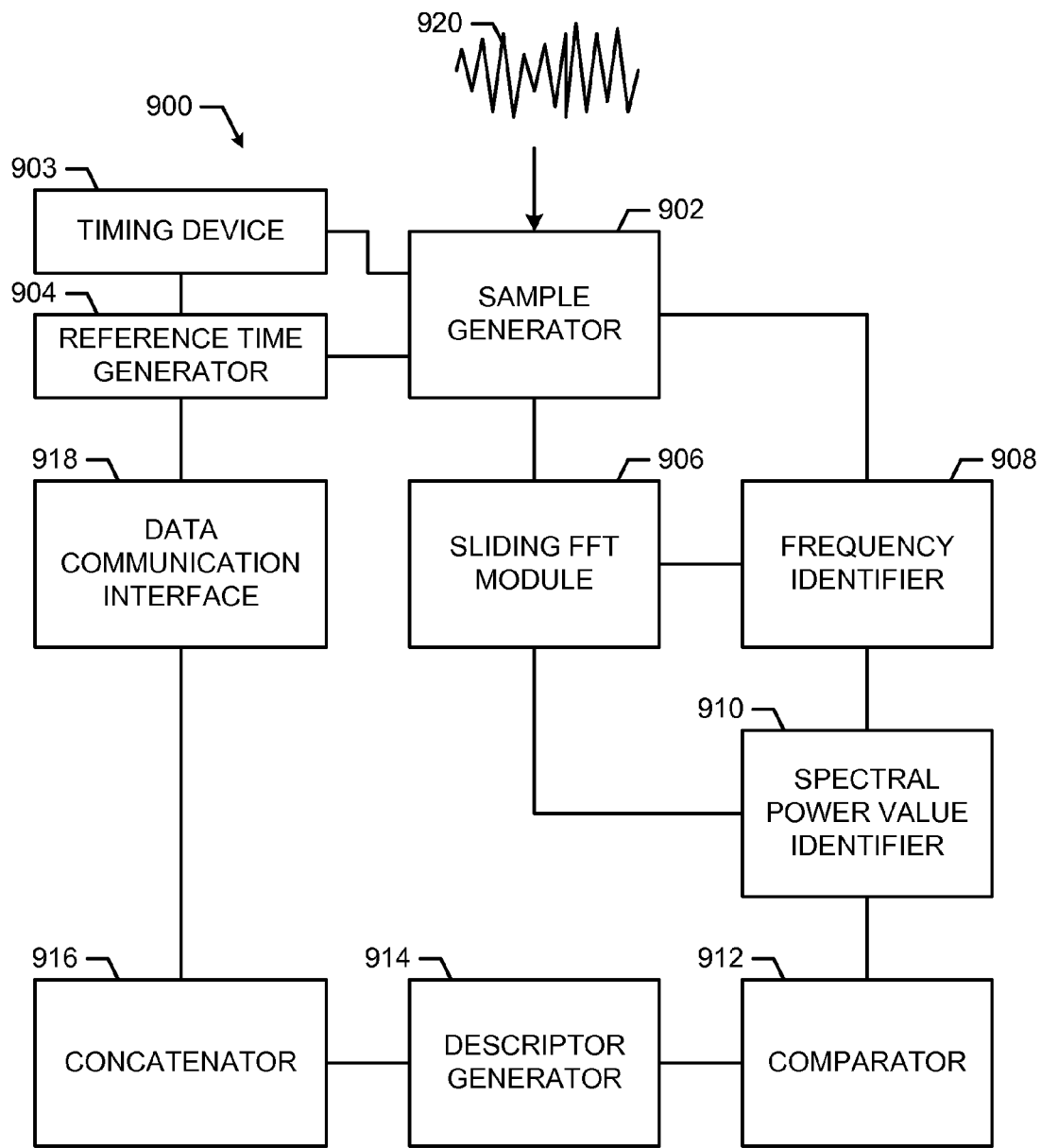
FIG. 9 is a block diagram of an example signature generation system for generating digital spectral signatures based on audio streams.

FIG. 9 is a block diagram of an example signature generation system 900 for generating digital spectral signatures. In particular, the example signature generation system 900 may be used to generate monitored signatures and/or reference signatures based on a sliding FFT as described above in connection with the example methods of FIGS. 4 and 5. For example, the example signature generation system 900 may be used to implement the signature generators 114 and 122 of FIG. 1A or the signature generators 156 and 158 of FIG. 1B. Additionally, the example signature generation system 900 may be used to implement the example methods of FIGS. 4 and 5.

As shown in FIG. 9, the example signature generation system 900 includes a sample generator 902, a timing device 903, a reference time generator 904, a sliding FFT module 906, a frequency identifier 908, a spectral power value identifier 910, a comparator 912, a descriptor generator 914, a concatenator 916, and a data communication interface 918, all of which may be communicatively coupled as shown. The example signature generation system 900 may be configured to obtain an example audio stream 920, acquire a plurality of audio samples from the example audio stream 920, and generate digital spectral signatures based on the audio samples.

The sample generator 902 may be configured to obtain the example audio stream 920, which may be any analog or digital audio stream. If the example audio stream 920 is an analog audio stream, the sample generator 902 may be implemented using an analog-to-digital converter. If the example audio stream 920 is a digital audio stream, the sample generator 902 may be implemented using a digital signal processor. Additionally, the sample generator 902 may be configured to acquire and/or extract audio samples at any desired sampling frequency $f_s$ and notify the reference time generator 904 when an audio sample acquisition process begins. The sample generator 902 communicates samples to the sliding FFT module 906. The sample generator 902 may also be configured to notify the frequency identifier 908 when an audio sample frame (e.g., one of the audio sample frames 204, 206, 208, and 210 of FIG. 2 or 304, 306, 308, and 310 of FIG. 3) or a sample segment (e.g., one of the sample segments 312a-f of FIG. 3) has been generated.

The timing device 903 may be configured to generate time data and/or timestamp information and may be implemented by a clock, a timer, a counter, and/or any other suitable device. The timing device 903 may be communicatively coupled to the reference time generator 904 and may be configured to communicate time data and/or timestamps to the reference time generator 904. The timing device 903 may also be communicatively coupled to the sample generator 902 and may assert a start signal or interrupt to instruct the sample generator 902 to begin collecting or acquiring audio sample data. In one example, the timing device 903 may be implemented by a real-time clock having a 24-hour period that tracks time at a resolution of milliseconds. In this case, the timing device 903 may be configured to reset to zero at midnight and track time in milliseconds with respect to midnight.

The reference time generator 904 may initialize a reference time to when a notification is received from the sample generator 902. As described above in connection with FIGS. 2 and 3, the reference time $t_0$ may be used to indicate the time within an audio stream at which a signature is generated. In particular, the reference time generator 904 may be configured to read time data and/or a timestamp value from the timing device 903 when notified of the beginning of a sample acquisition process by the sample generator 902. The reference time generator 904 may then store the timestamp value as the reference time to.

The sliding FFT module 906 may be configured to perform a sliding FFT using the audio samples obtained from the sample generator 902. As described above in connection with FIG. 4, a sliding FFT may update frequency spectrum data each time two samples (e.g., the two most recently acquired samples $v_{N_s-2}$ and $v_{N_s-1}$) are obtained from the sample generator 902.

The frequency identifier 908 may be configured to identify one or more frequency pairs from frequency spectrum data in response to a notification from the sample generator 902 that a new audio sample frame or a new sample segment has been generated. For example, if the example signature generation system 900 is configured to generate monitored signatures, the frequency identifier 908 identifies frequency pairs from the frequency spectrum data in response to a new audio sample frame notification. Alternatively, if the example signature generation system 900 is configured to generate reference signatures, an audio sample frame of data is formed with each new sample segment as described above in connection with FIG. 3. Therefore, the frequency identifier 908 identifies frequency pairs from the frequency spectrum data in response to a new sample segment notification. The frequency identifier 908 may then be configured to communicate indexes identifying the frequency components of the frequency pairs to the spectral power value identifier 910.

The spectral power value identifier 910 may be configured to obtain the indexes associated with the frequency components of the frequency pairs from the frequency identifier 908. The spectral power value identifier 910 may then determine or identify the spectral power of each frequency component of the frequency pairs by retrieving the spectral power value for each frequency component from the frequency spectrum data generated by the sliding FFT module 906. The spectral power values may then be communicated to the comparator 912.

As described above in connection with FIG. 5, the comparator 912 and the descriptor generator 914 may work cooperatively to generate M-bit descriptors. The comparator 912 may obtain the spectral power values and compare the spectral power values for each frequency pair. The descriptor generator 914 may be configured to obtain comparison results from the comparator 912 and generate the descriptor bits of an M-bit descriptor based on the comparison results.

The concatenator 916 may obtain descriptor values from the descriptor generator 914. When a complete set of descriptors is obtained, the concatenator 916 may concatenate the descriptors 916 to form a digital spectral signature. The data communication interface 918 may obtain the digital spectral signatures from the concatenator 916 and the reference time to corresponding to the digital spectral signature and communicate the same to a memory and/or a reference site. For example, if the example signature generation system 900 is configured to generate monitored signatures at the monitoring site 102 (FIG. 1A), the monitored signatures may be communicated to the central data collection facility (FIG. 1A) via the network 108 (FIG. 1A). Alternatively, if the example signature generation system 900 is configured to generate reference signatures, the reference signatures may be communicated to the central data collection facility 154 (FIG. 1B) and/or stored in the memory 134 (FIG. 1B).

Figure 10:
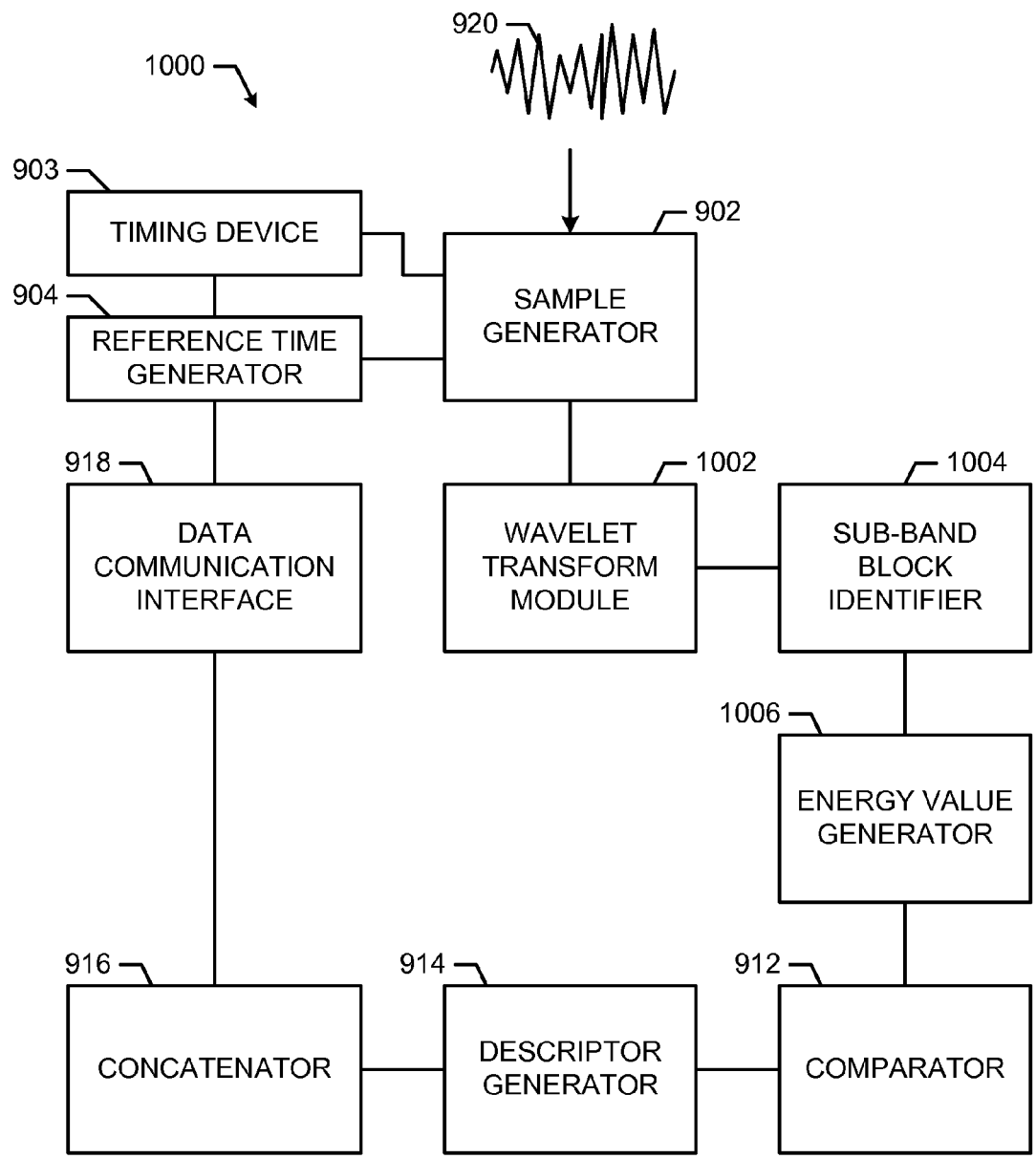
FIG. 10 is a block diagram of another example signature generation system for generating digital spectral signatures based on audio streams.

FIG. 10 is a block diagram of another example signature generation system 1000 for generating digital signatures based on audio streams. In particular, the example signature generation system 1000 may be used to generate monitored signatures and/or reference signatures based on wavelet transforms as described above in connection with the example methods of FIGS. 6 and 7. For example, the example signature generation system 1000 may be used to implement the signature generators 114 and 122 of FIG. 1A and generate monitored signatures. Additionally or alternatively, the example signature generation system 1000 may be used to implement the signature generators 156 and 158 of FIG. 1B. In addition, the example signature generation system 1000 may be used to implement the example methods of FIGS. 6 and 7.

The example signature generation system 1000 includes the sample generator 902, the timing device 903, the reference time generator 904, the comparator 912, the descriptor generator 914, the concatenator 916, and the data communication interface 918 of the example signature generation system 900 described above in connection with FIG. 9. Additionally, the example signature generation system 1000 includes a wavelet transform module 1002, a sub-band block identifier 1004, and an energy value generator 1006, all of which may be communicatively coupled as shown.

The wavelet transform module 1002 may be configured to apply wavelet transforms to audio samples obtained from the sample generator 902. For example, the wavelet transform module 1002 may obtain an audio sample frame (e.g., one of the audio sample frames 204, 206, 208, and 210 of FIG. 2 or 304, 306, 308, and 310 of FIG. 3) from the sample generator 902 and perform an M-level wavelet decomposition on the audio samples to generate filtered data values using, for example, the Daubechies wavelet transform as described in connection with FIGS. 6 and 7. The filtered data values may then be communicated to the sub-band block identifier 1004.

The sub-band block identifier 1004 may be configured to obtain the filtered data values from the wavelet transform module 1002 and generate a low-frequency sub-band block $L_x$ and a high-frequency sub-band block $H_x$. As described in greater detail above in connection with FIG. 7, the sub-band blocks $L_x$ and $H_x$ may be identified by de-interleaving the filtered data values. The low-frequency sub-band block may then be communicated to the wavelet transform module 1002 to perform another wavelet decomposition and the high-frequency sub-band filtered block may be communicated to the energy value generator 1006.

The energy value generator 1006 may be configured to generate energy values $E_x$ based on the high-frequency sub-band block. The energy value generator 1006 may be configured to parse or separate the high-frequency sub-band block into a first half of filtered data values and a second half of filtered data values as described in greater detail above in connection with FIG. 7. The energy value generator 1006 may then generate a first energy value $E_0$ by squaring and summing the first half of filtered data values. A second energy value $E_1$ may be generated by squaring and summing the second half of filtered data values.

The comparator 912 and the descriptor generator 914 may be configured to generate descriptors based on energy values. For example, the comparator 912 may obtain energy values from the energy value generator 1006 and compare a first energy to a second energy value. The descriptor generator 914 may obtain comparison results from the comparator 912 and generate the bits of an M-bit descriptor based on the comparison results.

The concatenator 916 may obtain descriptors from the descriptor generator 914 and generate digital spectral signatures by concatenating a plurality of descriptors as described above in connection with FIG. 9. The data communication interface 918 may then store or transmit signatures obtained from the concatenator 916 with corresponding reference times obtained from the reference time generator 904.

Figure 11:
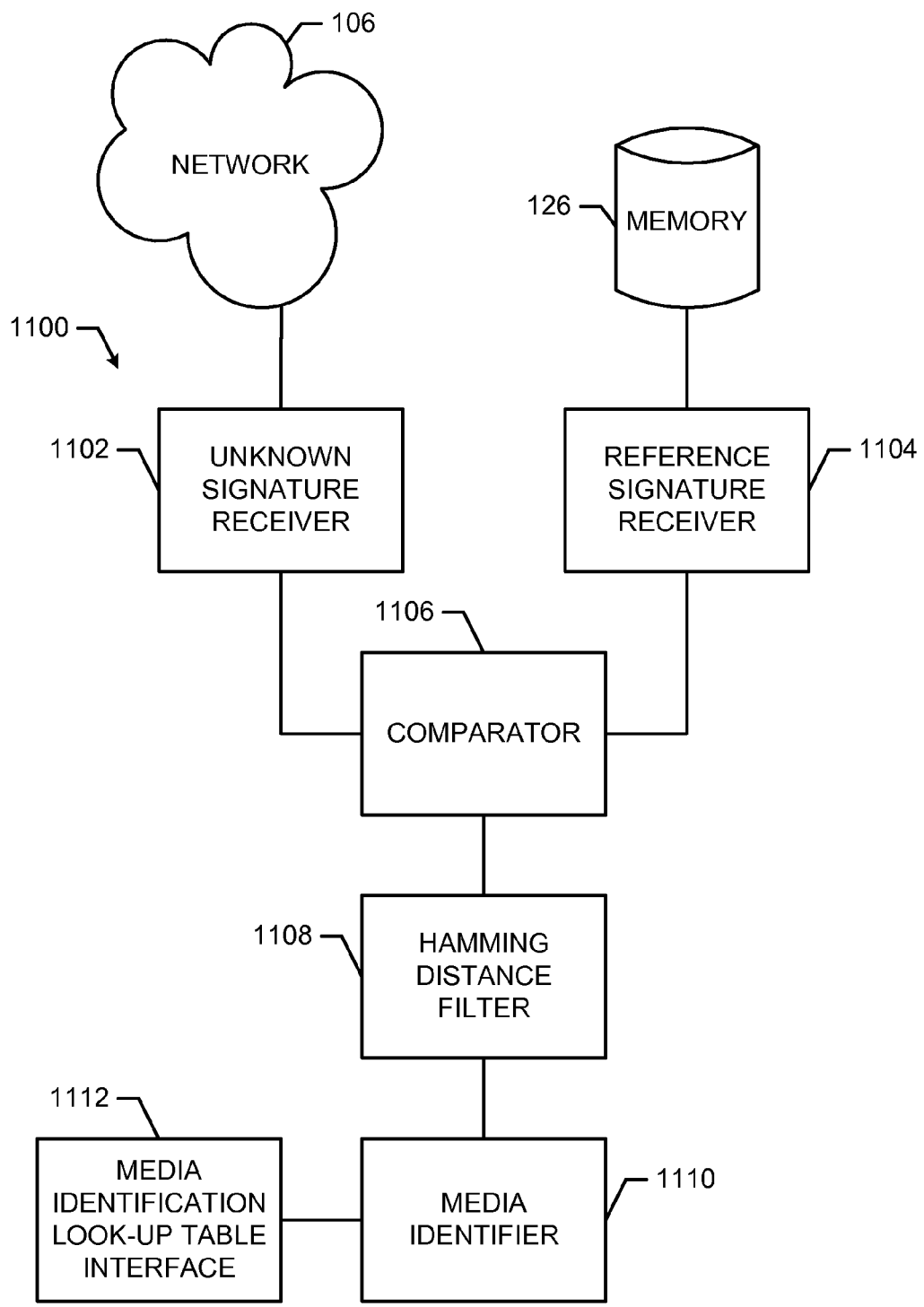
FIG. 11 is a block diagram of an example signature comparison system for comparing digital spectral signatures.

FIG. 11 is a block diagram of an example signature comparison system 1100 for comparing digital spectral signatures. In particular, the example signature comparison system 1100 may be used to compare monitored signatures with reference signatures. For example, the example signature comparison system 1100 may be used to implement the signature analyzer 132 of FIG. 1 to compare monitored signatures with reference signatures. Additionally, the example signature comparison system 1100 may be used to implement the example method of FIG. 8.

The example signature comparison system 1100 includes a monitored signature receiver 1102, a reference signature receiver 1104, a comparator 1106, a Hamming distance filter 1108, a media identifier 1110, and a media identification look-up table interface 1112, all of which may be communicatively coupled as shown.

The monitored signature receiver 1102 may be configured to obtain monitored signatures via the network 106 (FIG. 1) and communicate the monitored signatures to the comparator 1106. The reference signature receiver 1104 may be configured to obtain reference signatures from the memory 134 (FIGS. 1A and 1B) and communicate the reference signatures to the comparator 1106.

The comparator 1106 and the Hamming distance filter 1108 may be configured to compare reference signatures to monitored signatures using Hamming distances. In particular, the comparator 1106 may be configured to compare descriptors of monitored signatures with descriptors from a plurality of reference signatures and to generate Hamming distance values for each comparison. The Hamming distance filter 1108 may then obtain the Hamming distance values from the comparator 1106 and filter out non-matching reference signatures based on the Hamming distance values as described above in connection with FIG. 8.

After a matching reference signature is found, the media identifier 1110 may obtain the matching reference signature and in cooperation with the media identification look-up table interface 1112 may identify the media information associated with an unidentified audio stream (e.g., the example monitored audio stream 202 of FIG. 2). For example, the media identification look-up table interface 1112 may be communicatively coupled to a media identification look-up table or a database that is used to cross-reference media identification information (e.g., movie title, show title, song title, artist name, episode number, etc.) based on reference signatures. In this manner, the media identifier 1110 may retrieve media identification information from the media identification database based on the matching reference signatures.

Figure 12:
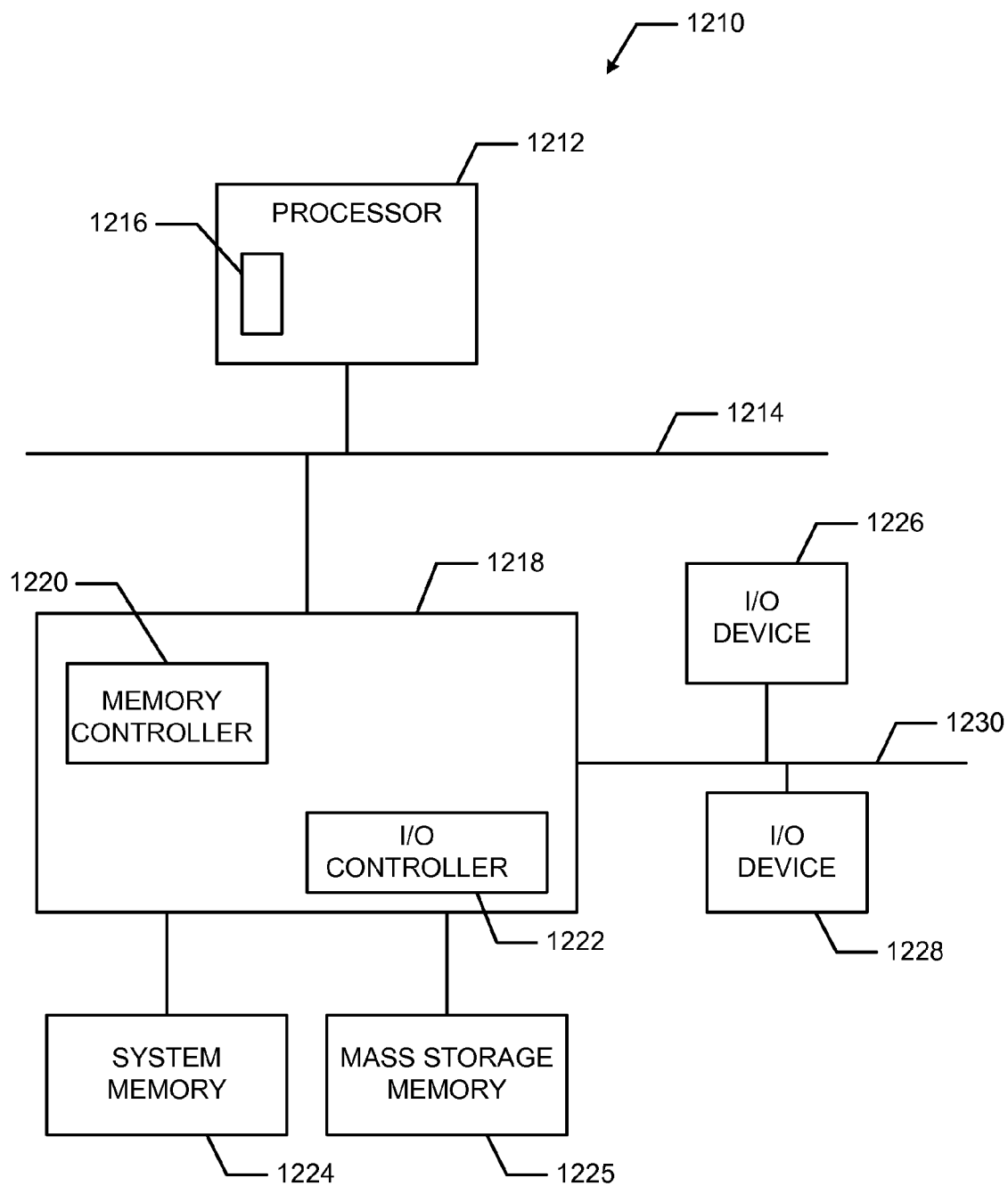
FIG. 12 is a block diagram of an example processor system that may be used to implement the methods and apparatus described herein.

FIG. 12 is a block diagram of an example processor system 1210 that may be used to implement the apparatus and methods described herein. As shown in FIG. 12, the processor system 1210 includes a processor 1212 that is coupled to an interconnection bus or network 1214. The processor 1212 includes a register set or register space 1216, which is depicted in FIG. 12 as being entirely on-chip, but which could alternatively be located entirely or partially off-chip and directly coupled to the processor 1212 via dedicated electrical connections and/or via the interconnection network or bus 1214. The processor 1212 may be any suitable processor, processing unit or microprocessor. Although not shown in FIG. 12, the system 1210 may be a multi-processor system and, thus, may include one or more additional processors that are identical or similar to the processor 1212 and that are communicatively coupled to the interconnection bus or network 1214.

The processor 1212 of FIG. 12 is coupled to a chipset 1218, which includes a memory controller 1220 and an input/output (I/O) controller 1222. As is well known, a chipset typically provides I/O and memory management functions as well as a plurality of general purpose and/or special purpose registers, timers, etc. that are accessible or used by one or more processors coupled to the chipset. The memory controller 1220 performs functions that enable the processor 1212 (or processors if there are multiple processors) to access a system memory 1224 and a mass storage memory 1225.

The system memory 1224 may include any desired type of volatile and/or non-volatile memory such as, for example, static random access memory (SRAM), dynamic random access memory (DRAM), flash memory, read-only memory (ROM), etc. The mass storage memory 1225 may include any desired type of mass storage device including hard disk drives, optical drives, tape storage devices, etc.

The I/O controller 1222 performs functions that enable the processor 1212 to communicate with peripheral input/output (I/O) devices 1226 and 1228 via an I/O bus 1230. The I/O devices 1226 and 1228 may be any desired type of I/O device such as, for example, a keyboard, a video display or monitor, a mouse, etc. While the memory controller 1220 and the I/O controller 1222 are depicted in FIG. 12 as separate functional blocks within the chipset 1218, the functions performed by these blocks may be integrated within a single semiconductor circuit or may be implemented using two or more separate integrated circuits.

The methods described herein may be implemented using instructions stored on a computer readable medium that are executed by the processor 1212. The computer readable medium may include any desired combination of solid state, magnetic and/or optical media implemented using any desired combination of mass storage devices (e.g., disk drive), removable storage devices (e.g., floppy disks, memory cards or sticks, etc.) and/or integrated memory devices (e.g., random access memory, flash memory, etc.).

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method for generating signatures implemented using an apparatus comprising a processor, the method comprising:
   obtaining a first frame of media samples;
   identifying a first frequency component having a first spectral power and a second frequency component having a second spectral power by performing a spectral transform operation on the first frame of media samples;
   determining a first descriptor of the first frame of media samples based on a comparison of the first spectral power and the second spectral power;
   generating a first signature based on the first descriptor;
   identifying a second frame of media samples by extracting a common plurality of media samples from the first frame of media samples and appending another plurality of media samples to the common plurality of media samples;
   identifying a third spectral power associated with a third frequency component and a fourth spectral power associated with a fourth frequency component, wherein the third frequency component and the fourth frequency component are associated with performing the spectral transform operation on the second frame of media samples;
   determining a second descriptor based on a comparison of the third spectral power and the fourth spectral power; and
   generating a second signature based on the second descriptor.

2. A method as defined in claim 1, further comprising identifying media information based on the first signature.

3. A method as defined in claim 2, wherein a Hamming distance is used to identify the media information based on the first signature.

4. A method as defined in claim 2, wherein the media information is associated with at least one of audio information or video information.

5. A method as defined in claim 1, wherein the first descriptor is associated with only the first frame of media samples.

6. A method as defined in claim 1, wherein the second descriptor is of the second frame of media samples.

7. A method as defined in claim 1, wherein the spectral transform operation is a sliding Fast Fourier Transform.

8. An apparatus for generating signatures, comprising:
   a processor system including a memory; and
   instructions stored in the memory that enable the processor system to:
      obtain a first and second frames of media samples, the first and second frames of media samples consecutively located in an audio stream, a portion of the first frame of media samples overlapping with a portion of the second frame of media samples;
      identify a first frequency component having a first spectral power and a second frequency component having a second spectral power by performing a spectral transform operation on the first frame of media samples;
      identify a third spectral power and a fourth spectral power; determine a first descriptor of the first frame of media samples based on a comparison of the first spectral power and the second spectral power;
      determine a second descriptor of the second frame of media samples based on a comparison of the third spectral power and the fourth spectral power; and generate a first signature based on the first descriptor and a second signature based on the second descriptor.

9. An apparatus as defined in claim 8, wherein the instructions stored in the memory enable the processor system to identify media information based on the first signature.

10. An apparatus as defined in claim 9, wherein a Hamming distance is used to identify the media information based on the first signature.

11. An apparatus as defined in claim 8, wherein the first descriptor is associated with only the first frame of media samples.

12. An apparatus as defined in claim 8, wherein the instructions stored in the memory enable the processor system to:
obtain a first plurality of media samples; and
identify the second frame of media samples by extracting a common plurality of media samples from the first frame of media samples and appending the first plurality of media samples to the common plurality of media samples, the common plurality of media samples including the overlapping portions of the first and second frames of media samples.

13. An apparatus as defined in claim 8, wherein the third spectral power is associated with a third frequency component and the fourth spectral power is associated with a fourth frequency component, and wherein the third frequency component and the fourth frequency component are associated with performing the spectral transform operation on the second frame of media samples.

14. A tangible machine accessible medium having instructions stored thereon that, when executed, cause a machine to:
obtain a first frame first and second frames of media samples, the first and second frames of media samples consecutively located in an audio stream, a portion of the first frame of media samples overlapping with a portion of the second frame of media samples;
identify a first frequency component having a first spectral power and a second frequency component having a second spectral power by performing a spectral transform operation on the first frame of media samples;
identify a third spectral power and a fourth spectral power;
determine a first descriptor of the first frame of media samples based on a comparison of the first spectral power and the second spectral power;
determine a second descriptor of the second frame of media samples based on a comparison of the third spectral power and the fourth spectral power; and
generate a first signature based on the first descriptor and a second signature based on the second descriptor.

15. A tangible machine accessible medium as defined in claim 14, wherein the first descriptor is associated with only the first frame of media samples.

16. A tangible machine accessible medium as defined in claim 14 having instructions stored thereon that, when executed, cause the machine to:
obtain a first plurality of media samples; and
identify the second frame of media samples by extracting a common plurality of media samples from the first frame of media samples and appending the first plurality of media samples to the common plurality of media samples, the common plurality of media samples including the overlapping portions of the first and second frames of media samples.

17. A tangible machine accessible medium as defined in claim 14, wherein third spectral power is associated with a third frequency component and the fourth spectral power is associated with a fourth frequency component, and wherein the third frequency component and the fourth frequency component are associated with performing the spectral transform operation on the second frame of media samples.

* * * * *